(12) United States Patent
Lee et al.

(10) Patent No.: US 11,507,318 B2
(45) Date of Patent: Nov. 22, 2022

(54) STORAGE DEVICE, FOR ALLOCATING PHYSICAL SPACE FOR LOGICAL ADDRESS BEFORE RECEIVING WRITE REQUEST, OPERATING METHOD THEREOF, AND STORAGE SYSTEM INCLUDING THE SAME

(71) Applicant: RESEARCH & BUSINESS FOUNDATION SUNGKYUNKWAN UNIVERSITY, Gyeonggi-do (KR)

(72) Inventors: Sang-Won Lee, Seoul (KR); Gihwan Oh, Suwon-si (KR); Soyee Choi, Suwon-si (KR); Jonghyeok Park, Suwon-si (KR)

(73) Assignee: RESEARCH & BUSINESS FOUNDATION SUNGKYUNKWAN UNIVERSITY, Gyeonggi-do (KR)

( * ) Notice: Subject to any disclaimer, the term of this patent is extended or adjusted under 35 U.S.C. 154(b) by 0 days.

(21) Appl. No.: 17/154,319

(22) Filed: Jan. 21, 2021

(65) Prior Publication Data

US 2022/0121396 A1 Apr. 21, 2022

(30) Foreign Application Priority Data

Oct. 20, 2020 (KR) .......................... 10-2020-0136170

(51) Int. Cl.
*G06F 3/06* (2006.01)
*G06F 12/1009* (2016.01)

(52) U.S. Cl.
CPC .......... *G06F 3/0659* (2013.01); *G06F 3/0604* (2013.01); *G06F 3/064* (2013.01);
(Continued)

(58) Field of Classification Search
CPC ...... G06F 3/0604; G06F 3/064; G06F 3/0659; G06F 12/1009; G06F 2212/657;
(Continued)

(56) References Cited

U.S. PATENT DOCUMENTS

2014/0281172 A1 9/2014 Seo et al.
2017/0153843 A1* 6/2017 Dewitt .................. G06F 3/0644
(Continued)

FOREIGN PATENT DOCUMENTS

KR 2014-0112303 A 9/2014
WO WO-2020/052321 A1 3/2020

*Primary Examiner* — Larry T Mackall
(74) *Attorney, Agent, or Firm* — Harness, Dickey & Pierce, P.L.C.

(57) ABSTRACT

Disclosed is a storage device, which include a non-volatile memory device including a plurality of memory blocks, a buffer memory, and a storage controller that receives a first allocation request and first logical address information from a host, allocates logical addresses of the first logical address information to a first physical group of the plurality of memory blocks in response to the first allocation request, receives a first write request and first write data associated with the first logical address information, stores the first write data in the buffer memory, and writes the first write data stored in the buffer memory in memory blocks of the first physical group in response to the first write request. The first allocation request precedes the first write request.

19 Claims, 14 Drawing Sheets

(52) U.S. Cl.
CPC ........ *G06F 3/0679* (2013.01); *G06F 12/1009* (2013.01); *G06F 2212/657* (2013.01)

(58) Field of Classification Search
CPC ...... G06F 3/061; G06F 3/0616; G06F 3/0631; G06F 3/0643; G06F 3/0656; G06F 3/0679; G06F 12/0246; G06F 12/0292; G06F 2212/7201
See application file for complete search history.

(56) References Cited

U.S. PATENT DOCUMENTS

2017/0262365 A1* 9/2017 Kanno .................... G06F 12/06
2020/0066360 A1* 2/2020 Eno ........................ G11C 16/10

* cited by examiner

STORAGE DEVICE, FOR ALLOCATING PHYSICAL SPACE FOR LOGICAL ADDRESS BEFORE RECEIVING WRITE REQUEST, OPERATING METHOD THEREOF, AND STORAGE SYSTEM INCLUDING THE SAME

CROSS-REFERENCE TO RELATED APPLICATIONS

This application claims priority under 35 U.S.C. § 119 to Korean Patent Application No. 10-2020-0136170 filed on Oct. 20, 2020, in the Korean Intellectual Property Office, the disclosures of which are incorporated by reference herein in their entireties.

BACKGROUND

Embodiments of the presented disclosure described herein relate to a storage device, an operating method thereof, and a storage system including the same, and more particularly, relate to a storage device including a non-volatile memory device, an operating method of the storage device, and a storage system including the storage device.

A storage device including a non-volatile memory device receives a write request from a host and then allocates a physical address to a logical address corresponding to the write request. For example, when a write request for data is received from an application program executed on the host, the host transmits data, a logical address corresponding to the data, and a write request to the storage device. The storage device allocates a physical address to the logical address received from the host and writes the received data in a storage space of the non-volatile memory device, which corresponds to the allocated physical address.

The non-volatile memory device may perform a write operation and a read operation in units of page but may perform an erase operation in units of block. The non-volatile memory device may not support a function of overwriting new data on previously stored data. For this reason, the non-volatile memory device may erase a memory block in which the previously stored data are present and may then write the new data in a free block. As such, in the case where data having the same life cycle are scattered around and stored in a plurality of memory blocks, a write amplification characteristic of the storage device may become worse.

SUMMARY

Embodiments of the presented disclosure provide a storage device allocating a physical space to a logical space before a write request is received from a host, an operating method of the storage device, and a storage system including the storage device.

According to some embodiments, a storage device may include a non-volatile memory device including a plurality of memory blocks, a buffer memory, and a storage controller that receives a first allocation request and first logical address information from a host, allocates logical addresses of the first logical address information to a first physical group of the plurality of memory blocks in response to the first allocation request, receives a first write request and first write data associated with the first logical address information, stores the first write data in the buffer memory, and writes the first write data stored in the buffer memory in memory blocks of the first physical group in response to the first write request, and the first allocation request may precede the first write request.

According to some embodiments, an operating method of a storage device which includes a non-volatile memory including a plurality of memory blocks and a storage controller may include receiving a first allocation request and first logical address information about a first logical space from a host, allocating a first physical group identifier (ID) to logical addresses of the first logical address information, receiving a first write request for first write data associated with the first logical address information from the host, storing the first write data in a buffer memory of the storage device, and writing the first write data stored in the buffer memory in a first memory block associated with the first physical group ID from among the plurality of memory blocks, in response to the first write request, and the first allocation request precedes the first write request.

According to some embodiments, an operating method of a storage system which includes a host and a storage device may include calling, at the host, a first command for allocating a first logical space to first data, calling, at the host, a second command for allocating a physical space to the first logical space to the storage device in response to the first command, allocating, at the storage device, a first physical group ID to logical addresses of first logical address information about the first logical space in response to the second command, requesting, at the host, the storage device to store first write data associated with the first logical address information, and storing, at the storage device, the first write data in a buffer memory of the storage device and writing the first write data stored in the buffer memory in a first memory block of a plurality of memory blocks of a non-volatile memory device which the storage device includes.

BRIEF DESCRIPTION OF THE FIGURES

The above and other objects and features of the presented disclosure will become apparent by describing in detail embodiments thereof with reference to the accompanying drawings.

DETAILED DESCRIPTION

Below, embodiments of the presented disclosure may be described in detail and clearly to such an extent that an ordinary one in the art easily implements the presented disclosure.

Hereinafter, some embodiments of the presented disclosure will be described in detail with reference to accompanying drawings. With regard to the description of the presented disclosure, to make the overall understanding easy, similar components will be marked by similar reference signs/numerals in drawings, and thus, additional description will be omitted to avoid redundancy.

Figure 1:
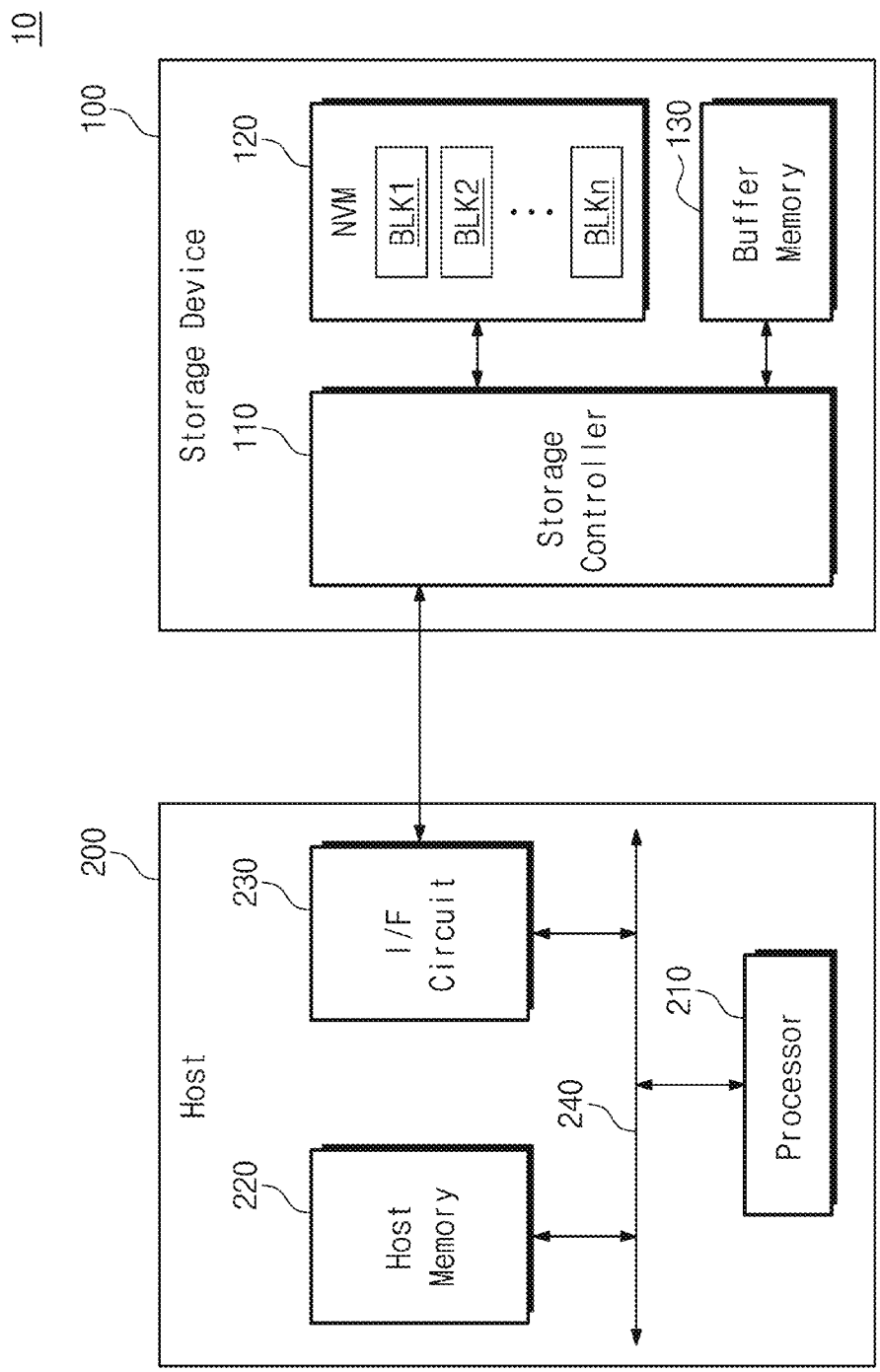
FIG. 1 is a block diagram illustrating a storage system according to an embodiment of the presented disclosure.

FIG. 1 is a block diagram illustrating a storage system according to an embodiment of the presented disclosure. Referring to FIG. 1, a storage system 10 may include a storage device 100 and a host 200. The storage device 100 may be controlled by the host 200.

The host 200 may control an operation of the storage device 100. In an embodiment, the storage device 100 may include one or more solid state drives (SSDs). In this case, the storage device 100 may include a plurality of flash memory chips. For example, the storage device 100 may include NAND flash memory chips or NOR flash memory chips.

The storage device 100 may include a storage controller 110, a non-volatile memory device 120, and a buffer memory 130. The storage controller 110 may communicate with the host 200. For example, the storage controller 110 may receive a command, an address, and/or data from the host 200 for the purpose of performing operations. The address received from the host 200 may be a logical address. The storage controller 110 may allocate a physical space for the received logical address.

In an embodiment, the storage controller 110 may in advance allocate the physical space for the received logical address before receiving a write request for data from the host 200. By in advance allocating a physical space, the storage controller 110 may generate instances (e.g., instances FAI1 to FAIm and NFAI of FIG. 4) and may return an index of each instance to the host 200. An operation in which the storage controller 110 allocates a physical space in advance will be more fully described later.

The storage controller 110 may store the received data in the non-volatile memory device 120 based on the received command and address. The storage controller 110 may read data stored in the non-volatile memory device 120 based on the received command and address and may store the read data in the buffer memory 130. The storage controller 110 may transmit the data stored in the buffer memory 130 to the host 200. Operations of the storage device 100 that are controlled by the storage controller 110 will be more fully described later.

The non-volatile memory device 120 may perform the following operations under control of the storage controller 110: a write operation and a read operation. The non-volatile memory device 120 may include a plurality of memory blocks BLK1 to BLKn (n being a positive integer). Each of the memory blocks BLK1 to BLKn may be composed of a plurality of pages. Each of the pages may be composed of a plurality of memory cells. The non-volatile memory device 120 may perform the read operation and the write operation in units of page. The non-volatile memory device 120 may perform the erase operation in units of memory block.

The buffer memory 130 may temporarily store write data that are received from the host 200 so as to be stored in the non-volatile memory device 120 or may temporarily store read data output from the non-volatile memory device 120. The write data temporarily stored in the buffer memory 130 may be written in the non-volatile memory device 120. The read data temporarily stored in the buffer memory 130 may be transmitted to the host 200 through the storage controller 110.

The host 200 may include a host processor 210, a host memory 220, an interface circuit 230, and a bus 240. The host processor 210 may perform operations for executing a variety of software loaded onto the host processor 210. For example, the host processor 210 may drive an operating system (OS) and application programs. The host processor 210 may function as a central processing unit (CPU) of the host 200.

The host memory 220 may store data, which are processed or to be processed by the host processor 210, and program codes. The host memory 220 may function as a main memory device of the host processor 210. For another example, user data and metadata (e.g., a file system) stored in the storage device 100 may be loaded onto the host memory 220. In an embodiment, the host memory 220 may include a dynamic random access memory (DRAM) or a static random access memory (SRAM). The host memory 220 may be referred to as a "buffer memory" or a "cache memory". Unlike the example illustrated in FIG. 1, the host 200 may include two or more host memories 220.

The interface circuit 230 may communicate with the storage controller 110 of the storage device 100. For example, the interface circuit 230 may perform format conversion on a command, an address, and data corresponding to a request generated by the host processor 210 and may transmit the converted command, address, and data to the storage controller 110. The interface circuit 230 may convert a format of data received from the storage controller 110 and may transmit the converted data to the host processor 210 through the bus 240. In an embodiment, the interface circuit 230 may use one of various protocols such as PCIe (Peripheral Component Interconnect express), NVMe (Non-Volatile Memory express), SATA (Serial Advanced Technology Attachment), SCSI (Small Computer System Interface), SAS (Serial Attached SCSI), and USB (Universal Serial Bus) protocols.

The bus 240 may provide a communication path between the components 210, 220, and 230 of the host 200. The host processor 210, the host memory 220, and the interface circuit 230 may exchange data with each other through the bus 240. The bus 240 may be configured to support various communication formats that are used in the host 200.

Figure 2:
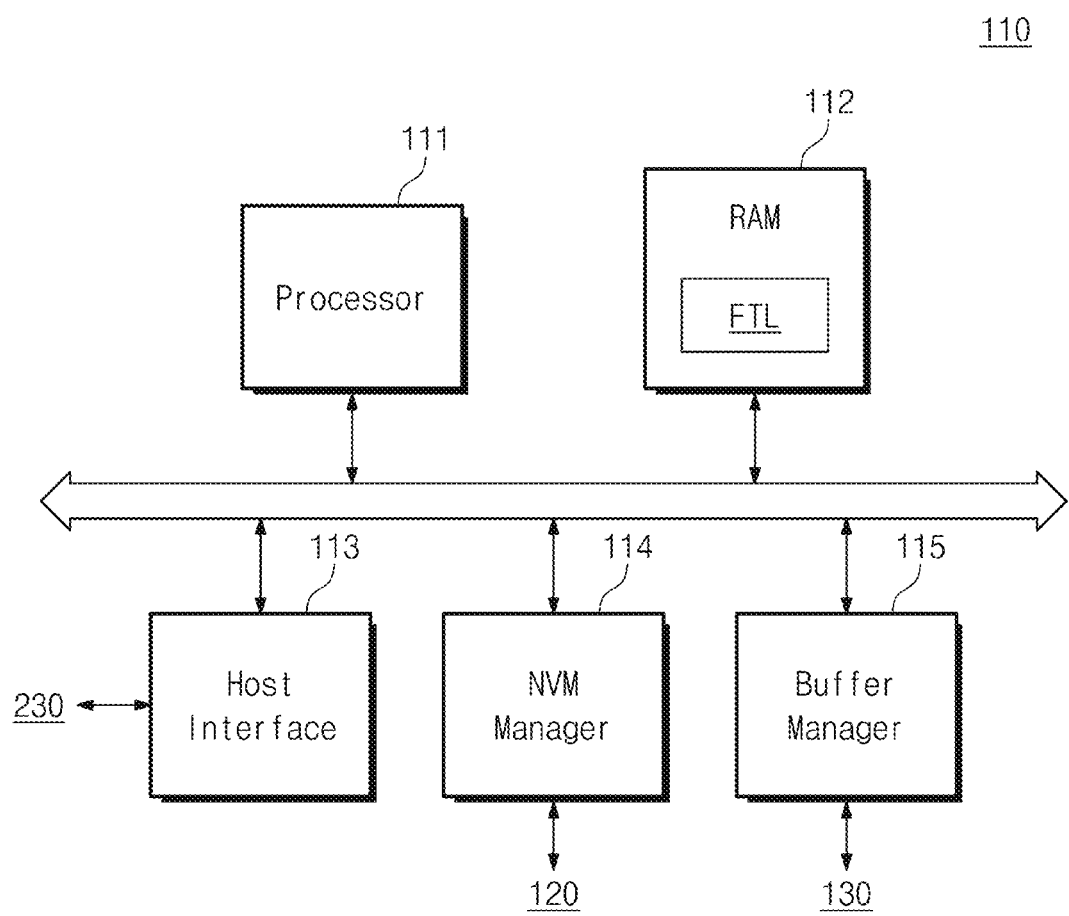
FIG. 2 is a block diagram illustrating a storage controller of FIG. 1.

FIG. 2 is a block diagram illustrating a storage controller of FIG. 1. Referring to FIGS. 1 and 2, the storage controller 110 may include a processor 111, a RAM 112, a host interface circuit 113, a non-volatile memory device manager 114, and a buffer manager 115.

The processor 111 may function as a central processing unit of the storage controller 110. The processor 111 may execute firmware or software for driving the storage controller 110. For example, the processor 111 may execute firmware loaded onto the RAM 112. The processor 111 may drive a flash translation layer (FTL) for managing the non-volatile memory device 120 by using the RAM 112.

The RAM 112 may operate under the control of the processor 111. Software or firmware that is executed by the processor 111 to control the storage controller 110 may be loaded onto the RAM 112. The RAM 112 may include a DRAM or an SRAM. For example, the flash translation layer FTL may be loaded onto the RAM 112. Unlike the example illustrated in FIG. 2, the storage controller 110 may include two or more RAMs 112.

The flash translation layer FTL may include modules for performing various functions. For example, the flash translation layer FTL may include an address conversion module, which translates a logical address received from the host 200 to a physical address indicating a storage space of the non-volatile memory device 120, and an instance generation module. The flash translation layer FTL may further include modules for performing various background functions associated with the non-volatile memory device 120. For example, the flash translation layer FTL may further include modules for performing a garbage collection operation or a trim operation. Operations that are performed by the flash translation layer FTL will be more fully described later.

The host interface circuit 113 may communicate with the host 200. For example, the host interface circuit 113 may provide a physical connection between the storage controller 110 and the interface circuit 230 of the host 200. The host interface circuit 113 may convert a format of data or a command, which is exchanged between the storage device 100 and the host 200, in compliance with a protocol of the interface circuit 230 (or a bus format of the host 200).

The non-volatile memory device manager 114 may exchange data with the non-volatile memory device 120 under control of the processor 111. For example, the non-volatile memory device manager 114 may write data transmitted from the buffer memory 130 in the non-volatile memory device 120 through a relevant memory channel (e.g., one of channels CH1 to CHz of FIG. 9).

The buffer manager 115 may manage a memory region of the buffer memory 130 under control of the processor 111. For example, the buffer manager 115 may temporarily store write data received from the host 200 in the buffer memory 130. The buffer manager 115 may temporarily store read data read from the non-volatile memory device 120 in the buffer memory 130. The buffer manager 115 may load address mapping tables generated by the flash translation layer FTL onto the buffer memory 130. The buffer manager 115 may read the write data or the read data, which are temporarily stored in the buffer memory 130, from the buffer memory 130.

Figure 3A:
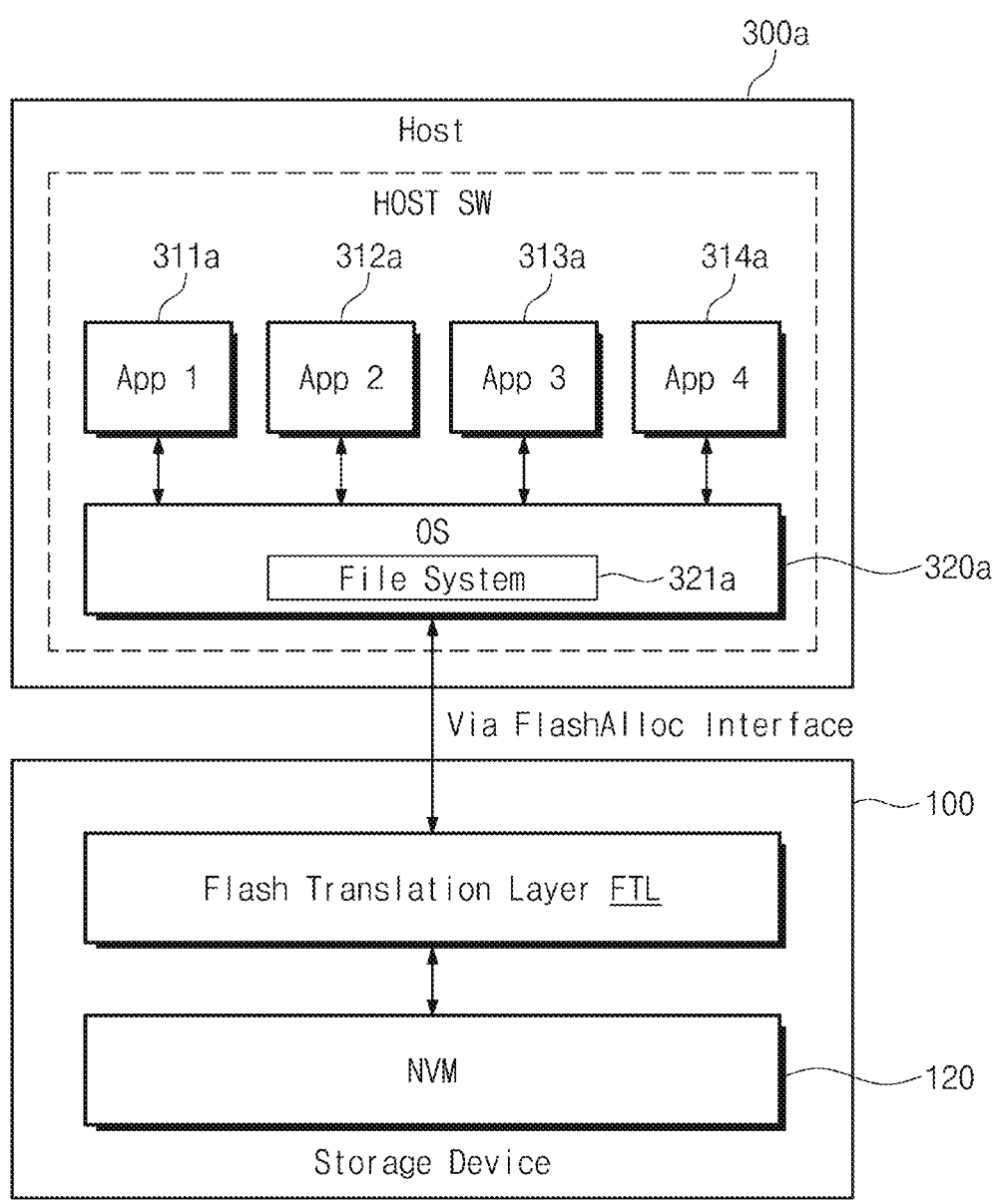
FIG. 3A is a block diagram illustrating a software layer of a storage system of FIG. 1, according to an embodiment of the presented disclosure.

FIG. 3A is a block diagram illustrating a software layer of a storage system of FIG. 1, according to an embodiment of the presented disclosure. Referring to FIGS. 1, 2, and 3A, a software layer of a host 300a of the storage system 10 may include application programs 311a to 314a and an OS 320a. For convenience of description, the remaining components of the storage device 100 other than the flash translation layer FTL and the non-volatile memory device 120 will be omitted.

The application programs 311a to 314a may include various application programs that are driven on the storage system 10 or the host 300a. The number of application programs that are driven on the host 300a is not limited to the embodiment illustrated in FIG. 3A.

The OS 320a may organize files or data that are used by the application programs 311a to 314a. For example, the OS 320a may drive a file system 321a in response to a request of the application program 311a, 312a, 313a, or 314a. The OS 320a may allocate a logical address to data, which are to be stored in the storage device 100 or are stored in the storage device 100, based on the file system 321a. The OS 320a may manage the allocated logical address. In an embodiment, the OS 320a may allocate a storage space, which is larger than that requested by the application program 311a, 312a, 313a, or 314a, to requested data.

In an embodiment, a format of the file system 321a may be determined depending on the storage system 10 or an operating system of the host 300a. For example, the file system 321a may include an FAT (File Allocation Table), an FAT32, an NTFS (New Technology File System), an HFS (Hierarchical Flash Storage), a JFFS (Journaling Flash File System), a JFFS2, an XFS, a UFS (Unix File System), an APFS (Apple File System), an ReFS (Resilient File System), an ext2, an ext3, an ext4, or an F2FS (Flash-Friendly File System).

The OS 320a may call a "FlashAlloc" command for allocating a physical space to the flash translation layer FTL of the storage device 100 in response to a system call for allocating a logical address of the application program 311a, 312a, 313a, or 314a. An operation of the flash translation layer FTL corresponding to the "FlashAlloc" command will be more fully described later.

The flash translation layer FTL may perform various maintenance operations between the host 300a and the non-volatile memory device 120. Operations of the flash translation layer FTL, the buffer memory 130, and the non-volatile memory device 120 will be more fully described with reference to FIG. 4.

Figure 3B:
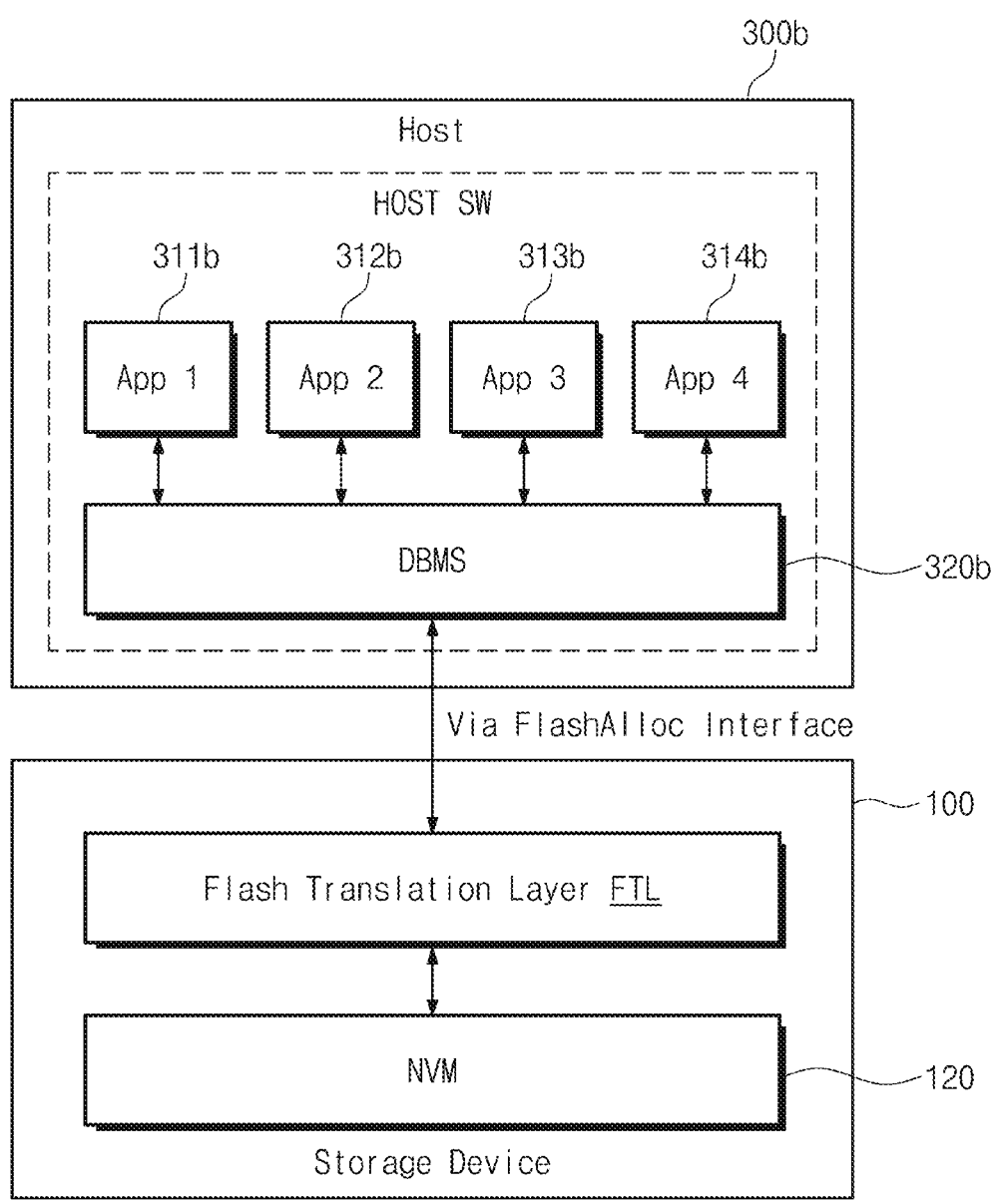
FIG. 3B is a block diagram illustrating a software layer of a storage system of FIG. 1, according to another embodiment of the presented disclosure.

FIG. 3B is a block diagram illustrating a software layer of a storage system of FIG. 1, according to another embodiment of the presented disclosure. A difference between the embodiments of FIGS. 3A and 3B will be described with reference to FIGS. 1, 2, 3A, and 3B.

In the embodiment illustrated in FIG. 3B, application programs 311b to 314b and a database management system (DBMS) 320b may be driven on a software layer of a host 300b. The number of application programs capable of being driven on the software layer of the host 300b is not limited to the embodiment illustrated in FIG. 3B.

The database management system 320b may organize data that are used by each of the application programs 311b to 314b. For example, in response to a request of the application program 311b, 312b, 313b, or 314b, the database management system 320b may allocate a logical address to data that are to be stored in a database built in the non-volatile memory device 120 of the storage device 100 or are stored in the database. The database management system 320b may manage the allocated logical address.

In an embodiment, a format of the database management system 320b may be determined depending on the storage system 10 or an operating system of the host 300b. For example, the database management system 320b may include ORACLE, MySQL, MSSQL, MariaDB, RocksDB, or the like. The database management system 320b may be implemented with a relational database management system (RDBMS), a NoSQL database management system, an in-memory database management system (IMDBMS), a column database management system (CDBMS), or the like.

The database management system 320b may call the "FlashAlloc" command to the flash translation layer FTL of the storage device 100 in response to a system call for allocating a logical address of the application program 311b, 312b, 313b, or 314b.

Figure 4:
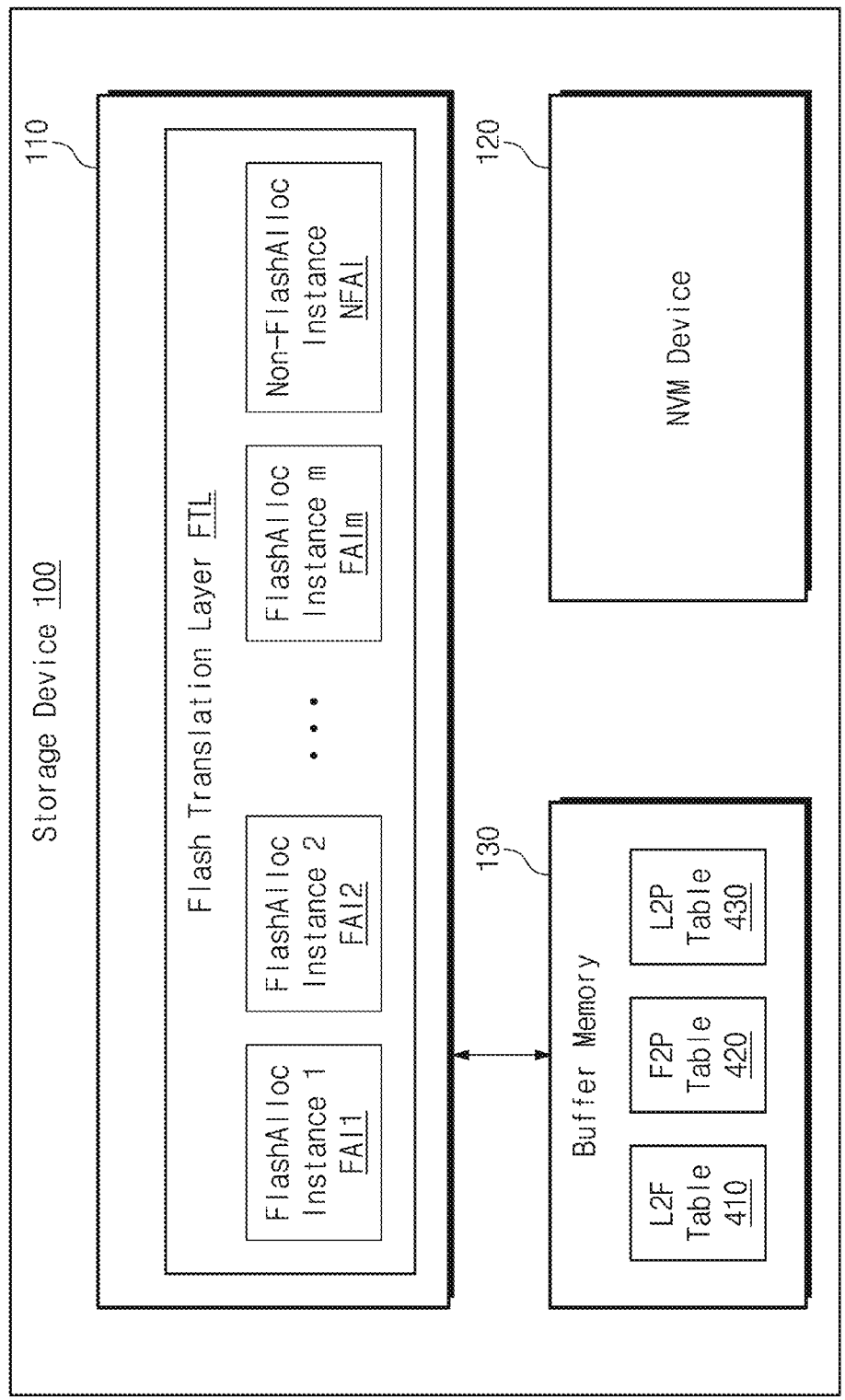
FIG. 4 is a block diagram illustrating a storage device of FIG. 1.

FIG. 4 is a block diagram illustrating a storage device of FIG. 1. Referring to FIGS. 1, 2, 3A, 3B, and 4, the flash translation layer FTL of the storage device 100 may generate the instances FAI1 to FAIm and NFAI (m being a positive integer). For example, the flash translation layer FTL may generate the instances FAI1 to FAIm and NFAI for allocating a received logical address to one of two or more physical space groups in response to a request for physical space allocation of the OS 320a or the database management system 320b.

Each of the instances FAI1 to FAIm and NFAI may include metadata associated with a range of a logical space, a physical address corresponding to the range of the logical space, and a pointer indicating a location of the physical address, in which next data are to be written. In an embodiment, a physical address included in the metadata of each of the instances FAI1 to FAIm and NFAI may be associated with a physical block address (or number) or a physical page address (or number) of the non-volatile memory device 120.

In an embodiment, the instances FAI1 to FAIm (in the embodiment illustrated in FIG. 4, instances marked by "FlashAlloc Instance") associated with allocating a physical space group identifier (ID) may be activated. For example, the instance FAI1 and the instance FAI2 may be simultaneously included in the flash translation layer FTL as metadata.

In the instances FAI1 to FAIm and NFAI, ranges of logical spaces may not overlap each other and physical addresses corresponding to the ranges of the logical spaces may not overlap each other (or, in the instances FAI1 to FAIm and NFAI, there may be necessity that ranges of logical spaces may not overlap each other and physical addresses corresponding to the ranges of the logical spaces may not overlap each other). For example, a range of a logical space associated with the instance FAI1 may not overlap a range of a logical space associated with each of the remaining instances FAI2 to FAIm and NFAI. For another example, a physical address associated with the instance FAI1 may be different from a physical address associated with each of the remaining instances FAI2 to FAIm and NFAI.

The flash translation layer FTL may translate a logical address received from the host 200 to a physical address, based on the generated instances FAI1 to FAIm and NFAI. The flash translation layer FTL may manage a translation operation between logical addresses and physical addresses by updating address mapping tables loaded onto the buffer memory 130. Address mapping tables that are managed by the flash translation layer FTL may include a L2F (Logical Address to FlashAlloc Group ID) table 410, an F2P (FlashAlloc Group ID to Physical Address) table 420, and an L2P (Logical Address to Physical Address) table 430. The L2F table 410, the F2P table 420, and the L2P table 430 may be implemented to have one of various data structures such as an array structure, a linked list structure, and a tree structure.

The L2F table 410 may be a table indicating mapping between logical addresses of logical address information and a physical space group ID. For example, the flash translation layer FTL may allocate one of groups of a physical space to logical addresses of logical address information received from the host 200. Each group of the physical space may correspond to a plurality of physical addresses being continuous. The flash translation layer FTL may apply a group ID (or index) corresponding to the allocated group to the L2F table 410. In an embodiment, a logical address to be written in the L2F table 410 may be determined by the OS 320a or the database management system 320b. For example, a logical address may be written in the L2F table 410 as a logical page number (LPN) (or a logical page address) or a logical block number (or a logical block address).

The F2P table 420 may be a table indicating mapping between a physical space group ID and a physical address. For example, the flash translation layer FTL may allocate a physical address to each physical space group. The flash translation layer FTL may apply the allocated physical address to the F2P table 420. In an embodiment, the F2P table 420 may be a table for mapping a physical space group ID to a physical page number (PPN) (or a physical page address) of a memory block of the non-volatile memory device 120 or a number of a memory block (i.e., a physical block number (PBN) or a physical block address) of the non-volatile memory device 120.

The L2P table 430 may be a table indicating mapping between a logical address received from the host 200 and a physical address corresponding to a location of the non-volatile memory device 120, at which data corresponding to the received logical address are stored. For example, the storage controller 110 may store write data received from the host 200 in the non-volatile memory device 120, based on the L2F table 410 and the F2P table 420. The flash translation layer FTL may apply a physical address corresponding to a location of the non-volatile memory device 120, at which write data are stored, to the L2P table 430. In an embodiment, the L2P table 430 may be a table for mapping a logical address to a physical page number or a physical block number of a memory block of the non-volatile memory device 120. In some embodiments, unlike the illustrated embodiment, the L2F table 410 and the L2P table 430 may be separated logically, but physically implemented as a single table.

The storage controller 110 may store write data received from the host 200 in the non-volatile memory device 120 based on the L2F table 410, the F2P table 420, and the L2P table 430. The storage controller 110 may perform the read operation to read data stored in the non-volatile memory device 120 based on the L2P table 430. The write operation and the read operation of the storage controller 110 will be more fully described later.

Figure 5:
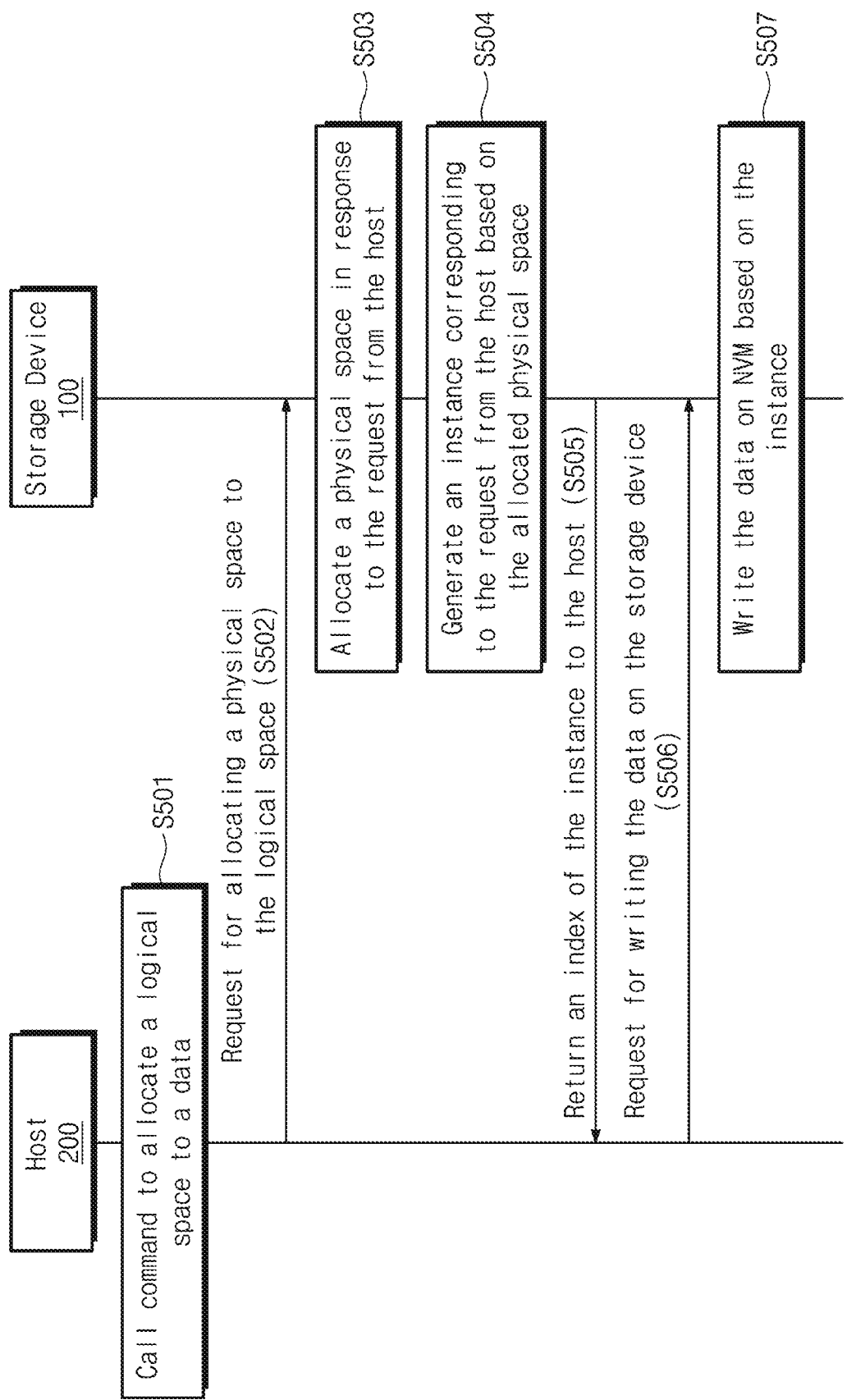
FIG. 5 is a flowchart illustrating operations of a storage system of FIG. 1.

FIG. 5 is a flowchart illustrating operations of a storage system of FIG. 1. Referring to FIGS. 1, 2, 3A, 3B, 4, and 5, the host 200 of the storage system 10 may perform operation S501, operation S502, and operation S506. The storage device 100 may perform operation S503, operation S504, operation S505, and operation S507.

In operation S501, the host 200 may allocate a logical space to data. For example, the application program 311a or 311b that is driven on the host 300a or 300b may request the OS 320a or the database management system 320b, which is driven on the host 300a, to allocate a space in which a file used or to be used by the application program 311a or 311b is to be stored. The OS 320a or the database management system 320b may call a system call (e.g., fallocate( )) for allocating a logical address, which is supported by the file system 321a or the database management system 320b. In response to the called system call, the OS 320a or the database management system 320b may allocate a logical address to data.

In operation S502, the host 200 may request the storage device 100 to allocate a physical space to a logical space. For example, the host 200 may transmit, to the storage device 100, a range of a logical space of data allocated to the storage device 100 and a command for requesting the allocation of a physical space. In an embodiment, the host 200 may provide logical address information including a value indicating a start address location of the allocated logical space and a length of the logical space to the storage device 100. For example, the host 300a or 300b may provide the storage device 100 with information about a length of a logical space, which is determined based on logical addresses that the OS 320a or the database management system 320b allocates. For another example, the host 200 may simultaneously provide the storage device 100 with a plurality of start value-length pairs, each start value-length pair in which a start value indicates a start address value of a plurality of logical addresses and a length indicates a length of a logical space.

In operation S503, in response to the request from the host 200, the storage device 100 may allocate a physical space to a logical space. For example, to allocate continuous physical addresses to logical addresses of the logical address information transmitted from the host 200, the storage device 100 may allocate a physical space group ID to the logical addresses of the logical address information transmitted from the host 200. The storage device 100 may allocate the physical space group ID to the logical addresses of the logical address information and may update an L2F table (e.g., the L2F table 410 of FIG. 4).

In an embodiment, the storage device 100 may update an F2P table (e.g., the F2P table 420 of FIG. 4) based on the L2F table 410. For example, the storage device 100 may allocate a specific memory block (or a physical block number) to the allocated physical space group ID. The storage device 100 may update the F2P table based on the allocated physical space group ID and the allocated specific memory block. A time when the storage device 100 allocates a specific memory block to a physical space group ID will be more fully described with reference to FIG. 10.

In operation S504, in response to the request from the host 200, the storage device 100 may generate an instance based on the allocated physical space.

For example, the flash translation layer FTL of the storage device 100 may generate an instance (e.g., one of the instances FAI1 to FAIm and NFAI of FIG. 4) based on the logical address information provided from the host 200 and a relevant physical space. The instance generated by the flash translation layer FTL of the storage device 100 will be more fully described with reference to FIGS. 6, 7, and 9.

In operation S505, the storage device 100 may return an index of the generated instance to the host 200. For example, the storage controller 110 may transmit the index of the instance generated in operation S504 to the OS 320a or the database management system 320b.

In operation S506, the host 200 may request the storage device 100 to write data. For example, the host 200 may transmit, to the storage device 100, a command directing a write operation, the logical address information about the logical space transmitted to the storage device 100 in operation S502, and write data to be written in the non-volatile memory device 120. The write data received from the host 200 may be temporarily stored in the buffer memory 130 of the storage device 100.

In operation S507, the storage device 100 may write data in the non-volatile memory device 120 based on the instance. For example, the storage controller 110 may search for an instance corresponding to the logical address information transmitted from the host 200 and may write the write data stored in the buffer memory 130 in the physical space of the non-volatile memory device 120 allocated in operation S504 based on the found index. The write operation of the storage device 100 will be more fully described with reference to FIG. 6.

Figure 6:
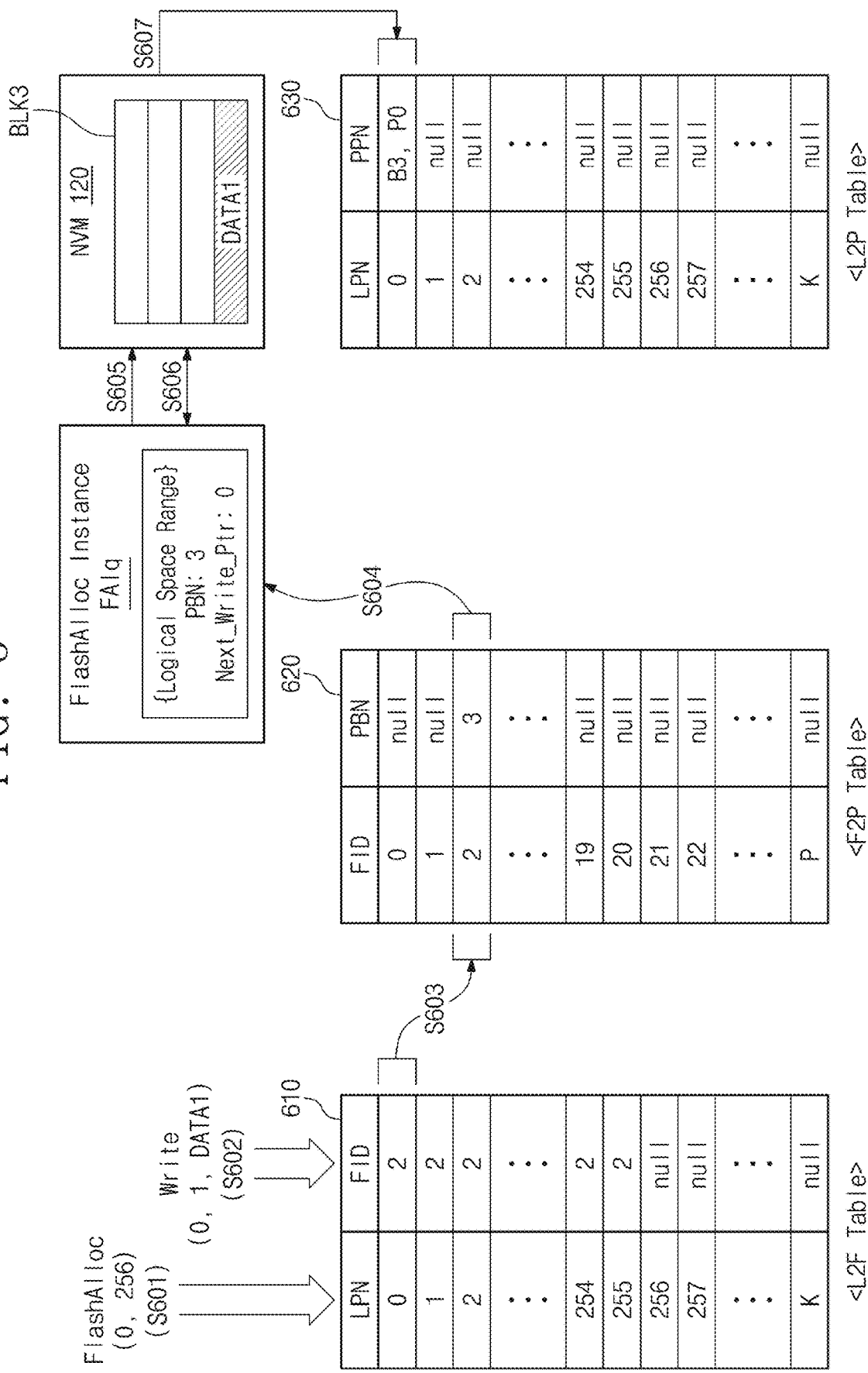
FIG. 6 illustrates a procedure of a physical space allocation operation and a write operation according to an embodiment of the presented disclosure.

FIG. 6 illustrates a procedure of a physical space allocation operation and a write operation according to an embodiment of the presented disclosure. Referring to FIGS. 1, 2, 3A, 3B, 4, 5, and 6, there will be described that a physical address is allocated to a logical address by the storage device 100 before a command associated with a write operation is issued by the host 200 and the write operation is then performed by the storage device 100 in response to that the command associated with the write operation is issued by the host 200.

In the embodiment illustrated in FIG. 6, a logical space may be allocated in units of page, a physical space group ID may be allocated in units of block, and a physical space is allocated in units of page. In other words, the translation from a logical address to a physical address is made in units of page. However, the presented disclosure is not limited thereto.

In the embodiment illustrated in FIG. 6, the OS 320a or the database management system 320b may use 0-th to K-th logical pages. In the embodiment illustrated in FIG. 6, the OS 320a or the database management system 320b may allocate 0-th to P-th logical objects (or logical blocks) to the application programs 311a to 314a or 311b to 314b. Here, "K" and "P" may be an integer of 0 or more.

In operation S601, in response to a physical space allocation request of the host 200, a command for in advance allocating a physical space may be called to the storage device 100. For example, the "FlashAlloc" command for in advance allocating a physical space of the non-volatile memory device 120 may be called with respect to logical address information about a range of a logical space received from the host 200. The term "FlashAlloc command" is used for convenience of description, and the presented disclosure is not limited to the term "FlashAlloc".

In an embodiment, the "FlashAlloc" command may be called to the storage device 100 by using a value associated with a logical space allocated by the OS 320a or the database management system 320b as a factor. For example, in the embodiment illustrated in FIG. 6, the "FlashAlloc" command may be called by using a logical address start value of "0" and a logical address length of "256" as a factor. In other words, a logical space transmitted from the host 200 to the storage device 100 may range from the 0-th logical page to a 255$^{th}$ logical page being a 256$^{th}$ logical page. As such, the storage device 100 may recognize that the 0-th to 255$^{th}$ logical pages belong to the same logical object.

The storage device 100 may update an L2F table 610 in response to the "FlashAlloc" command transmitted from the host 200. For example, the storage device 100 may allocate a physical space group ID to logical addresses of the logical address information transmitted from the host 200 and may map the logical addresses and the allocated physical space group ID. The storage device 100 may allocate a physical space group ID in various manners. For example, in the case where a physical space group ID of "1" is already allocated, the storage device 100 may allocate a physical space group ID of "2" to a logical space associated with the "FlashAlloc" command thus called. That is, the storage device 100 may allocate physical space group IDs in a sequential manner. For another example, the storage device 100 may allocate physical space group IDs in a random manner.

In the embodiment illustrated in FIG. 6, in response to the "FlashAlloc(0, 256)" command, the storage device 100 may allocate the physical space group ID of "2" to the 0-th to $255^{th}$ logical pages. The storage device 100 may update the L2F table 610 such that the physical space group ID of "2" is mapped onto the 0-th to $255^{th}$ logical pages. As such a single physical space group ID may be allocated to logical pages belonging to the same logical object.

In operation S602, the host 200 may issue a command for requesting the storage device 100 to perform a write operation. As such, a write command (in the embodiment illustrated in FIG. 6, a "Write" command) may be called to the storage device 100. In an embodiment, the write command may be called by using a logical address start value of the write data, a length of the write data, and the write data as a factor.

In the embodiment illustrated in FIG. 6, the write command may be called by using "0", "1", and first data DATA1. As such, the storage device 100 may recognize that the host 200 requests the storage device 100 to write the first data DATA1 being write data written at the 0-th logical page being the first logical page in the non-volatile memory device 120.

In operation S603, the storage device 100 may determine a physical space for writing the write data based on the command and the address received from the host 200 in operation S602. For example, in response to the write command called in operation S602, the storage device 100 may refer to the L2F table 610 and an F2P table 620. The storage device 100 may determine a physical block number corresponding to the logical addresses of the logical address information provided from the host 200 in operation S602 based on the L2F table 610 and the F2P table 620.

In the embodiment illustrated in FIG. 6, in response to a "Write(0, 1, DATA1)" command, the storage controller 110 of the storage device 100 may obtain "2" being the physical space group ID of the 0-th logical page from the L2F table 610. The storage controller 110 may obtain "3" being a physical block number corresponding to the physical space group ID of "2" from the F2P table 620.

In operation S604, the storage device 100 may look up an instance corresponding to the logical addresses of the logical address information provided from the host 200 in operation S602 from among the instances FAI1 to FAIm and NFAI activated on the flash translation layer FTL. For example, in the embodiment illustrated in FIG. 6, the storage controller 110 of the storage device 100 may look up an instance corresponding to the 0-th logical page being the logical page provided from the host 200. As a result, the storage device 100 may look up the instance FAIq including metadata associated with the range of the logical space including the 0-th logical page.

Unlike the embodiment illustrated in FIG. 6, the instance FAIq may be an instance that is not activated. In this case, the flash translation layer FTL of the storage controller 110 may generate the instance FAIq corresponding to the logical addresses of the logical address information provided from the host 200 in operation S602.

In an embodiment, the storage controller 110 may loop up a plurality of activated instances corresponding to the 0-th logical page. In this case, the storage controller 110 may return an error message to the host 200.

In operation S605, the storage device 100 may write the write data in the non-volatile memory device 120 based on the instance found (or generated) in operation S604. For example, the storage controller 110 of the storage device 100 may write the first data DATA1 received from the host 200 in the non-volatile memory device 120 with reference to the metadata included in the instance FAIq.

In the embodiment illustrated in FIG. 6, the instance FAIq may include the metadata including a "Next_Write_Ptr" pointer indicating that a next write location is a 0-th page of a third memory block. Accordingly, the storage controller 110 may write the first data DATA1 from the 0-th page of the memory block BLK3 being the third memory block of the non-volatile memory device 120.

In operation S606, the storage device 100 may update the instance found in operation S604. For example, the storage controller 110 of the storage device 100 may update the pointer included in the metadata of the instance found in the operation S604. In the embodiment illustrated in FIG. 6, after the storage controller 110 writes the first data DATA1 at the 0-th page of the memory block BLK3 in operation S605, the storage controller 110 may update the "Next_Write_Ptr" pointer of the metadata of the instance FAIq from "0" to "1".

In an embodiment, the storage controller 110 may determine whether data corresponding to the logical addresses of the logical address information received in operation S602 are stored in a correct block. The storage controller 110 may invalidate data stored in an incorrect memory block. For example, the storage controller 110 may invalidate data store in the memory block that does not coincide with each other in the L2F table 410 and the F2P table 420, with reference to the L2F table 610, the F2P table 620, and an L2P table 630.

For example, in response to the "Write(0, 1, DATA1)" command received from the host 200 in operation S602, the storage controller 110 may determine whether the data corresponding to the 0-th logical page are stored in a memory block different from the memory block BLK3, based on the L2P table 630. In the case where the data corresponding to the 0-th logical page are stored in the fifth memory block BLK5, not the memory block BLK3, the storage controller 110 may determine that data stored in the fifth memory block BLK5 are incorrect. Therefore, the storage controller 110 may invalidate a page(s) corresponding to the 0-th logical page from among pages of the fifth memory block BLK5.

In operation S607, the storage device 100 may update the L2P table 630. For example, the storage controller 110 of the storage device 100 may apply a result of performing operation S605 to the L2P table 630. In the embodiment illustrated in FIG. 6, the storage controller 110 may apply, to the L2P table 630, that the 0-th logical page corresponds to the 0-th page of the third memory block BLK3.

In the embodiment illustrated in FIG. 6, one memory block is allocated to one physical space group ID. However, a plurality of memory blocks may be allocated to one physical space group ID. For example, based on a size of a logical space corresponding to one physical space group ID and a size of one memory block, the storage controller 110 may allocate an appropriate number of memory blocks to the physical space group ID.

For example, the size of each of the memory blocks BLK1 to BLKn may be 8 MB. In the case where a logical object corresponding to a logical space requires a storage space of 64 MB, the storage controller 110 may allocate 8 memory blocks to a physical space group ID corresponding to the logical space.

In an embodiment, in the case where a logical space requires a storage space smaller than a size of a memory block, a plurality of physical space group IDs may be simultaneously allocated to one memory block. In other words, a plurality of logical spaces sharing one memory block may exist. In this case, a plurality of instances associated with the same memory block may be simultaneously activated.

Figure 7:
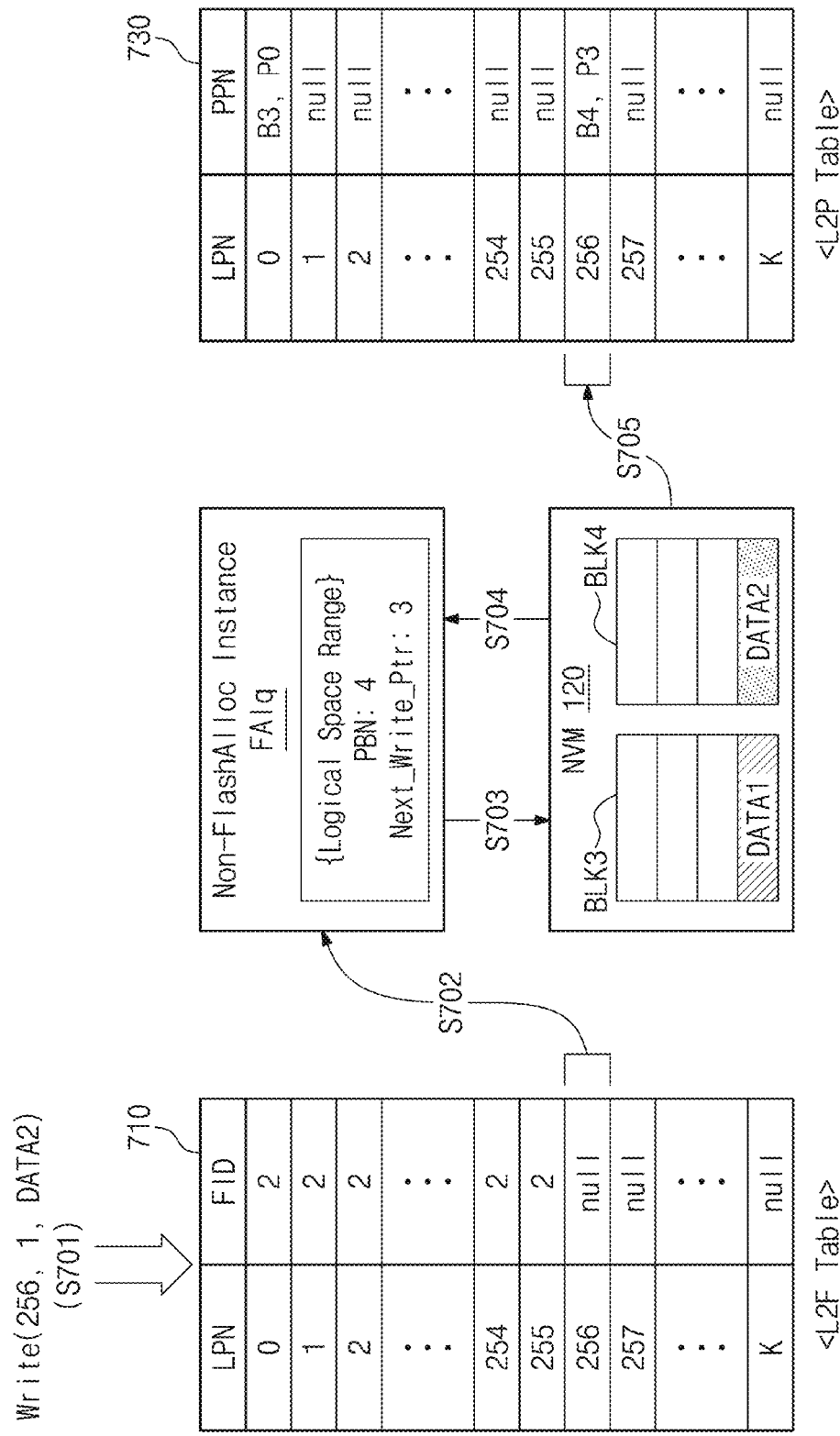
FIG. 7 illustrates a procedure of a write operation performed by a storage device, according to another embodiment of the presented disclosure.

FIG. 7 illustrates a procedure of a write operation according to another embodiment of the presented disclosure. Unlike the embodiment of FIG. 6, the embodiment of FIG. 7 where a write operation is performed by the storage device 100 in response to that a command associated with the write operation is issued by the host 200, without allocating a physical address to a logical address before the command is issued, will be described with reference to FIGS. 1, 2, 6, and 7.

In operation S701, the host 200 may issue a command that requests the write operation associated with a logical space and is not associated with a command for in advance allocating a physical space. As such, a write command may be called to the storage device 100.

In the embodiment illustrated in FIG. 7, the write command (i.e., "Write") may be called by using "256", "1", and second data DATA2 as a factor. As such, the storage device 100 may recognize that the host 200 requests the storage device 100 to write the second data DATA2 being write data written at the $256^{th}$ logical page being the first logical page in the non-volatile memory device 120.

The storage device 100 may refer to an L2F table 710. The storage device 100 may determine whether a physical space corresponding to a logical address received from the host 200 is already allocated, based on the L2F table 710.

In the embodiment illustrated in FIG. 7, in response to a "Write(256, 1, DATA2)" command, the storage controller 110 of the storage device 100 may recognize, from the L2F table 710, that a physical space group ID allocated to the $256^{th}$ logical page does not exist. As such, the storage controller 110 may recognize that a physical space previously allocated to the $256^{th}$ logical page does not exist.

In operation S702, the storage device 100 may look up an instance corresponding to the logical address provided from the host 200 from among the instances FAI1 to FAIm and NFAI activated on the flash translation layer FTL and may allocate the found instance to the physical space. For example, in the embodiment illustrated in FIG. 7, the storage controller 110 of the storage device 100 may look up an activated instance corresponding to the $256^{th}$ logical page being the logical page provided from the host 200. As a result, the storage controller 110 may look up the instance NFAI including metadata associated with a logical space range including the $256^{th}$ logical page. The instance NFAI may not be associated with the command (i.e., the "FlashAlloc" command) for allocating a physical space in advance. For example, the instance NFAI may not correspond to logical addresses to which the activated instances FAI1 to FAIm respectively correspond.

In the case where the instance NFAI does not include metadata associated with a physical block number, the storage controller 110 may allocate a memory block to the instance NFAI. For example, the storage controller 110 may allocate a memory block (e.g., the memory block BLK4) different from memory blocks allocated to physical space group IDs to the instance NFAI with reference to an F2P table (e.g., the F2P table 620 of FIG. 6).

Unlike the embodiment illustrated in FIG. 6, the instance NFAI may be an instance that is not activated. In this case, the flash translation layer FTL of the storage controller 110 may generate the instance NFAI corresponding to the logical address information provided from the host 200.

In operation S703, the storage device 100 may write the write data in the non-volatile memory device 120 based on the instance found (or generated) in operation S702. For example, the storage controller 110 of the storage device 100 may write the second data DATA2 received from the host 200 in the non-volatile memory device 120 with reference to the metadata included in the instance FAIq.

In the embodiment illustrated in FIG. 7, the instance NFAI may include the metadata including the "Next_Write_Ptr" pointer indicating that a next write location is a third page of a fourth memory block. Accordingly, the storage controller 110 may write the second data DATA2 from the third page of the memory block BLK4 being the fourth memory block of the non-volatile memory device 120.

In operation S704, the storage device 100 may update the instance found in operation S702. For example, the storage controller 110 of the storage device 100 may update the pointer included in the metadata of the instance found in the operation S702. In the embodiment illustrated in FIG. 7, after the storage controller 110 writes the second data DATA2 at the third to sixth pages of the memory block BLK4 in operation S703, the storage controller 110 may update the "Next_Write_Ptr" pointer of the metadata of the instance FAIq from "3" to "7".

In operation S705, the storage device 100 may update an L2P table 730. For example, the storage controller 110 of the storage device 100 may apply a result of performing operation S703 to the L2P table 730. In the embodiment illustrated in FIG. 7, the storage controller 110 may apply, to the L2P table 730, that the $256^{th}$ logical page corresponds to the third page of the fourth memory block BLK4.

Figure 8:
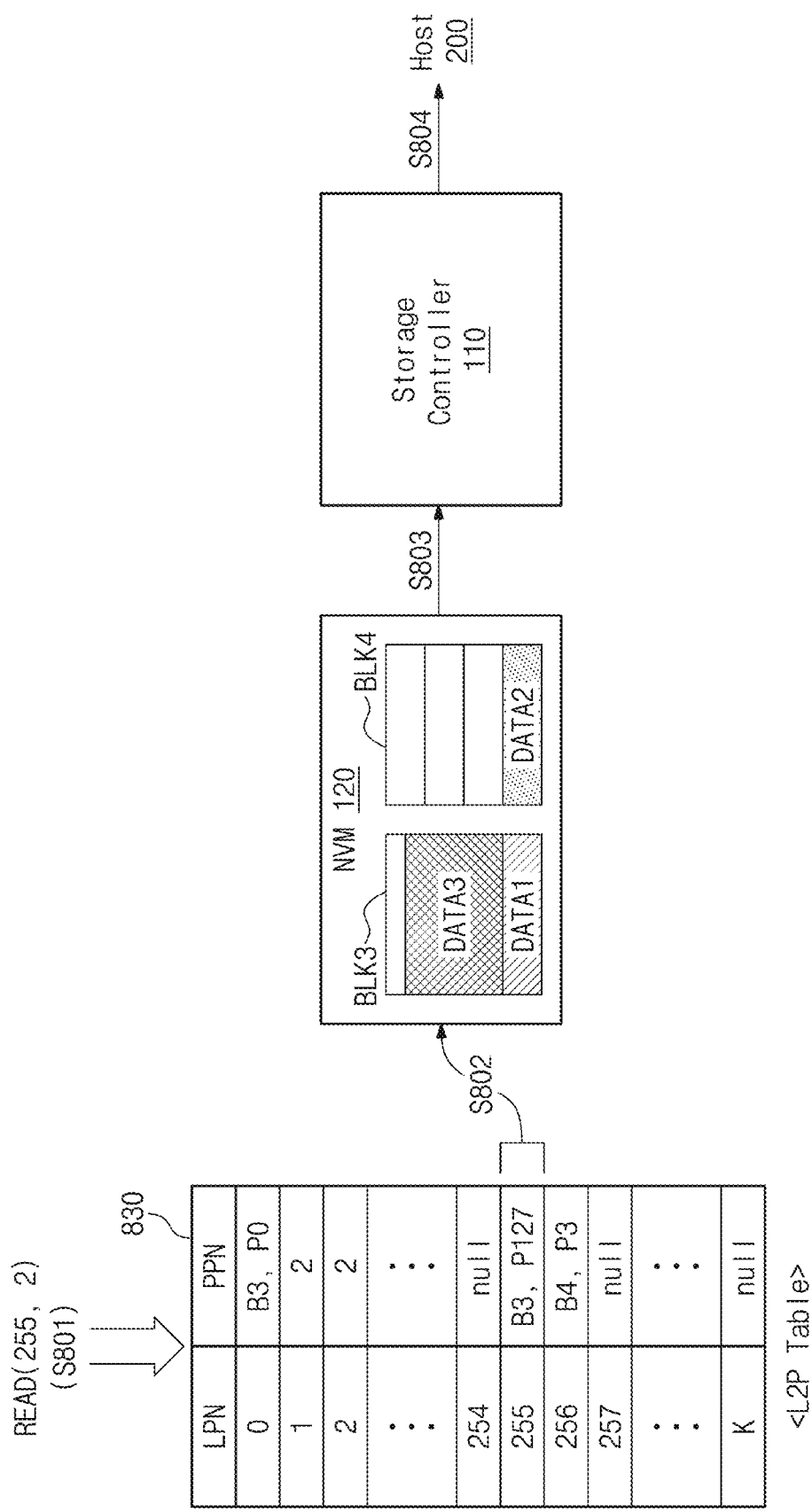
FIG. 8 illustrates a procedure of a read operation performed by a storage device, according to an embodiment of the presented disclosure.

FIG. 8 illustrates a procedure of a read operation according to an embodiment of the presented disclosure. A read operation of the storage device 100 will be described with reference to FIGS. 1, 2, and 8.

In operation S801, the storage device 100 may receive a command and an address generated from the host 200 with regard to the read operation. As such, a read command (in the embodiment illustrated in FIG. 7, "Read") may be called to the storage device 100. The read command may be called by using a start address value of a logical space targeted for the read operation and a length of the logical space as a factor.

In operation S802, the storage device 100 may access data stored in the non-volatile memory device 120 in response to the read command called in operation S801. For example, the storage controller 110 of the storage device 100 may access data of the non-volatile memory device 120, which the host 200 intends to read, based on an L2P table 830.

In the embodiment illustrated in FIG. 8, based on a "Read(255, 2)" command and the L2P table 830, the storage controller 110 may recognize that the $255^{th}$ logical page corresponds to a $127^{th}$ page of the memory block BLK3 being the third memory block. As such, in response to the "Read(255, 2)" command called in operation S801, the storage controller 110 may access at least a part of third data DATA3 stored at the $127^{th}$ page of the memory block BLK3.

In operation S803, the storage controller 110 of the storage device 100 may read data corresponding to the read command called in operation S801. For example, the storage controller 110 may read at least a part of the third data DATA3. The storage controller 110 may temporarily store the part of the third data DATA3 read in response to the read command called in operation S801 in the buffer memory 130 as read data.

In operation S804, the storage controller 110 of the storage device 100 may transmit the read data read in operation S803. For example, the storage controller 110 may transmit the read data temporarily stored in the buffer memory 130 to the host 200.

Figure 9:
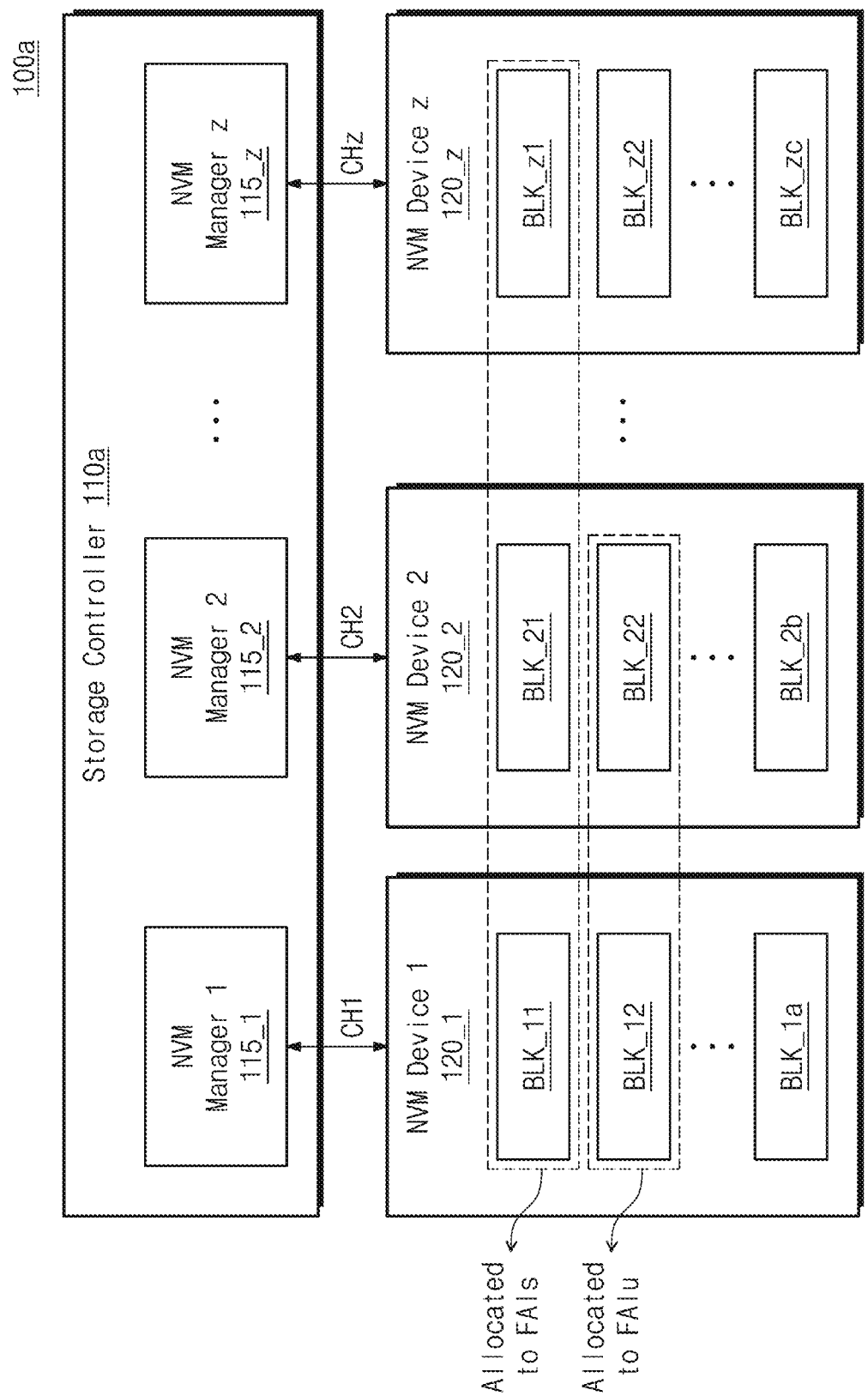
FIG. 9 is a block diagram illustrating a storage device of FIG. 1 according to another embodiment of the presented disclosure.

FIG. 9 is a block diagram illustrating a storage device of FIG. 1 according to another embodiment of the presented disclosure. Referring to FIGS. 1, 2, 4, and 9, a storage device 100a of FIG. 9 may include a storage controller 110a including a plurality of non-volatile memory device managers 115_1 to 115_z, and a plurality of non-volatile memory devices 120_1 to 120_z. The non-volatile memory device managers 115_1 to 115_z may respectively communicate with the non-volatile memory devices 120_1 to 120_z through channels CH1 to CHz.

In an embodiment, the storage controller 110a of the storage device 100a may channel-evenly allocate memory blocks to the instances FAI1 to FAIm associated with the command (e.g., the "FlashAlloc" command of FIG. 6) for allocating a physical space in advance. In other words, the storage controller 110a may allocate memory blocks to an instance such that the instance is associated with various channels as possible as evenly. As such, a bandwidth of a write operation and a read operation associated with an instance may decrease.

In the embodiment illustrated in FIG. 9, it is assumed that the storage controller 110a intends to allocate "z" memory blocks to an instance FAIs (s being a positive integer of m or less). The storage controller 110a may not allocate only the memory blocks BLK_11 to BLK_1a of the non-volatile memory device 120_1 corresponding to the channel CH1 to the instance FAIs, but the storage controller 110a may allocate memory blocks BLK_11 to BLK_z1 respectively corresponding to the channels CH1 to CHz to the instance FAIs. As such, the instance FAIs may be evenly associated with the "z" channels CH1 to CHz.

For another example, it is assumed that the storage controller 110a intends to allocate 2 memory blocks to an instance FAIu (u being a positive integer of m or less). The storage controller 110a may not allocate the memory blocks BLK_22 and BLK_23 of the non-volatile memory device 120_2 corresponding to the channel CH2 to the instance FAIs, but the storage controller 110a may allocate a memory block BLK_12 corresponding to the channel CH1 and a memory block BLK_22 corresponding to the channel CH2 to the instance FAIu. As such, the instance FAIu may be associated with the 2 channels CH1 and CH2.

In the case of allocating memory blocks to a specific instance, the storage device 100a may refer to a free block pool (not illustrated) of each of the channels CH1 to CHz. The free block pool may indicate free blocks of the corresponding channel. In the case where one or more free blocks are present in memory blocks corresponding to a specific channel, the storage controller 110a of the storage device 100a may allocate one of the remaining free blocks to an instance. However, in the case where a free block is absent from the memory blocks corresponding to the specific channel, the storage controller 110 may perform a garbage collection operation on the specific channel. The storage controller 110 may allocate a free block, which is obtained as a result of performing the garbage collection operation, to the instance. The garbage collection operation will be more fully described with reference to FIG. 12.

Figure 10:
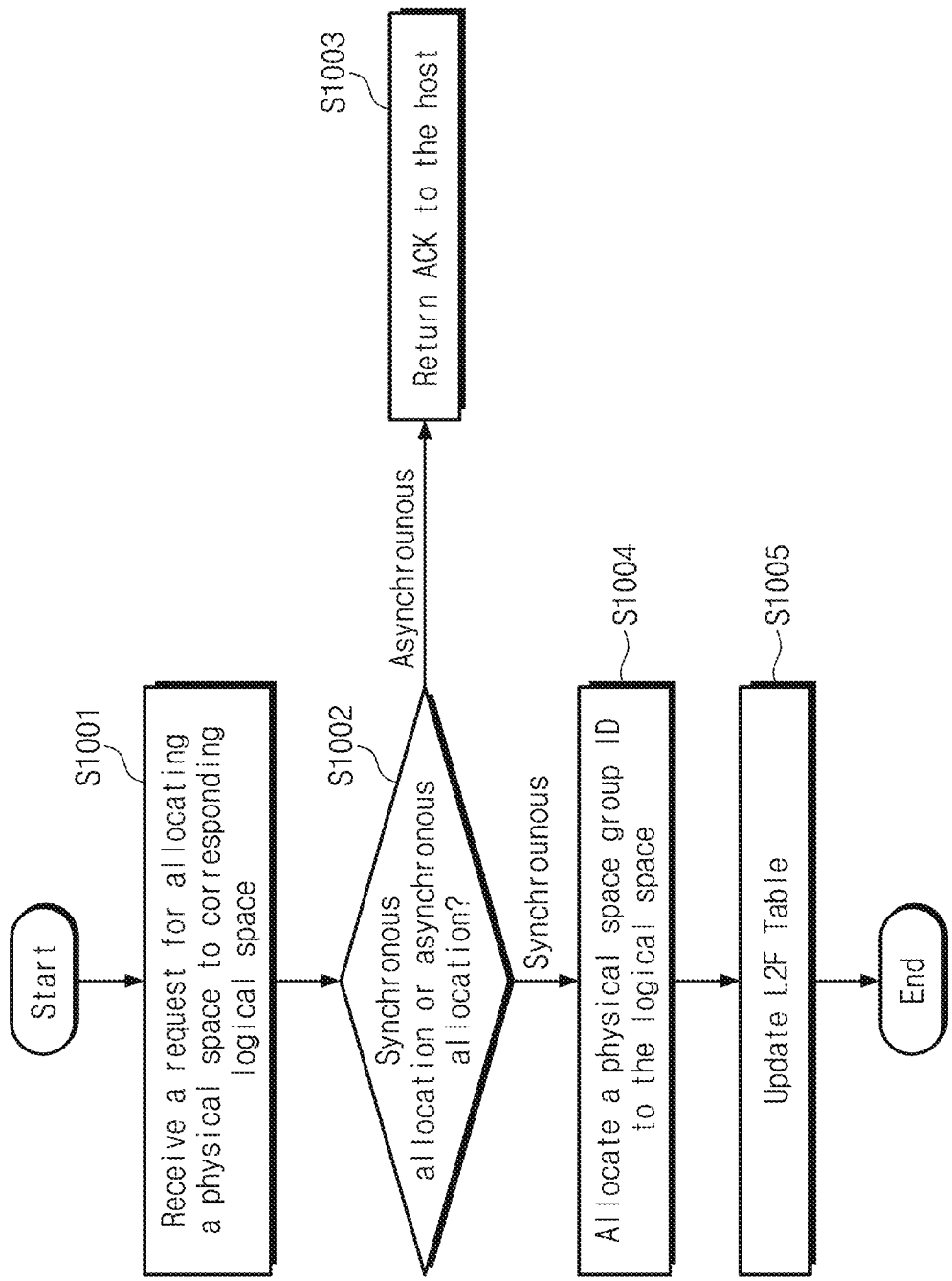
FIG. 10 is a flowchart illustrating how to allocate a physical space to a given logical space, according to an embodiment of the presented disclosure.

FIG. 10 is a flowchart illustrating how to allocate a physical space to a given logical space, according to an embodiment of the presented disclosure. Referring to FIGS. 1, 2, 4, and 10, the storage device 100 may perform operation S1001 to operation S1005.

In operation S1001, the storage device 100 may receive a request directing the allocation of a physical space to a given logical space. For example, the storage device 100 may receive logical address information about the logical space and the request directing the allocation of the physical space to the logical space from the host 200.

In operation S1002, the storage device 100 may determine whether the allocation of the physical space is synchronous allocation or asynchronous allocation.

For example, the storage device 100 may perform operation S1002 based on a command received from the host 200. For another example, when free blocks are not sufficiently present in a free block pool, the storage device 100 may determine the allocation of the physical space as asynchronous. When it is determined that the allocation of the physical space is the synchronous allocation, the storage device 100 may immediately perform operation S1004.

When it is determined in operation S1002 that the allocation of the physical space is the asynchronous allocation, the storage device 100 may perform operation S1003. In operation S1003, the storage device 100 may return an acknowledgment to the host 200 before allocating the physical space. After a given time passes, the storage device 100 may perform operation S1004. For example, the storage device 100 may perform operation S1004 at a time when a write command is received from the host 200 for the first time after operation S1001 is performed. For another example, the storage device 100 may perform operation S1004 at a time when a reference time determined by the command received from the host 200 passes after operation S1001 is performed.

In operation S1004, the storage device 100 may allocate a physical space group ID to the logical space. In operation S1005, the storage device 100 may update the L2F table 410 based on a result of performing operation S1004.

Figure 11:
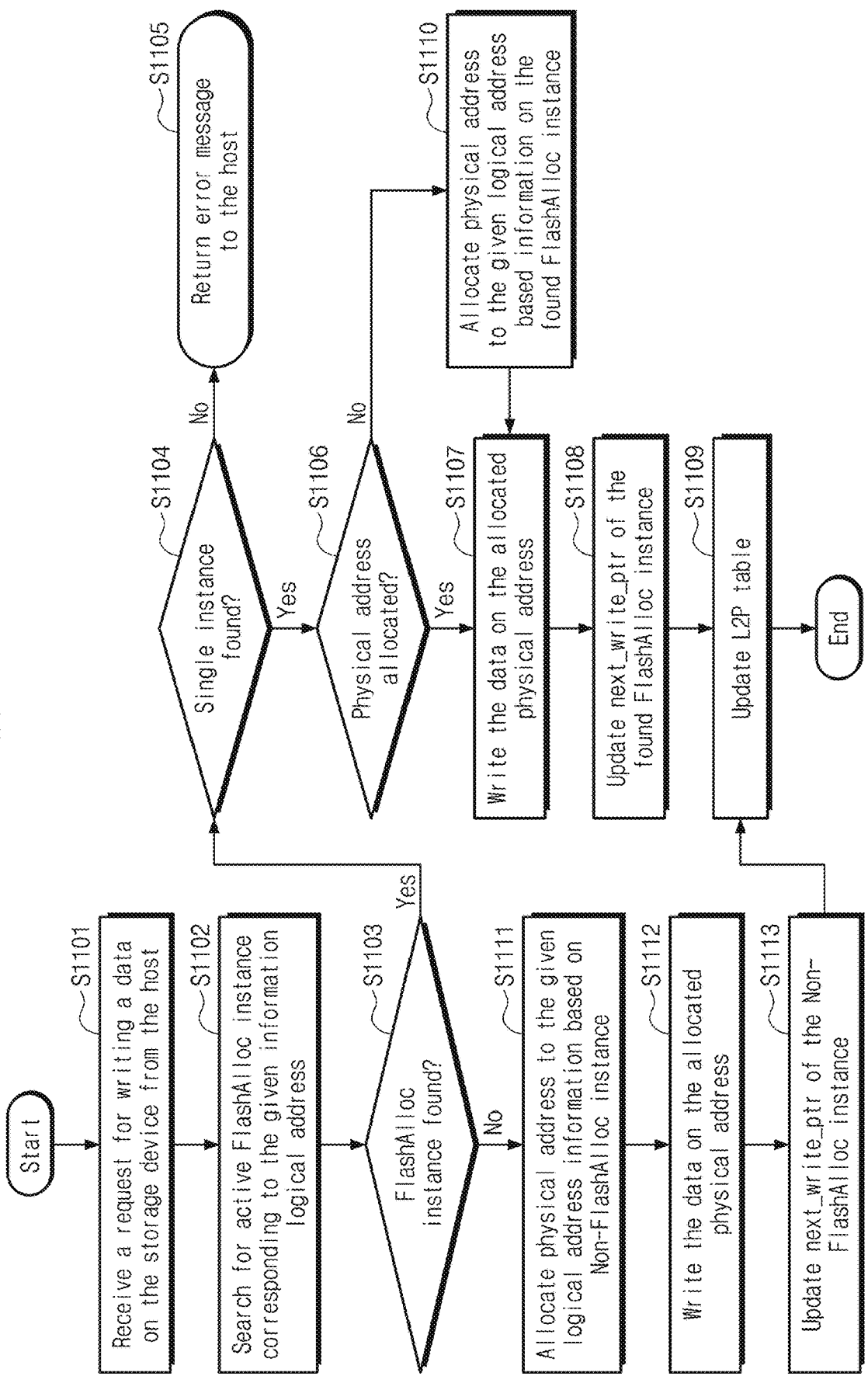
FIG. 11 is a flowchart illustrating how to perform a write operation according to an embodiment of the presented disclosure.

FIG. 11 is a flowchart illustrating how to perform a write operation according to an embodiment of the presented disclosure. Referring to FIGS. 1, 2, 4, and 11, the storage device 100 may perform operation S1101 to operation S1113.

In operation S1101, the storage device 100 may receive, from the host 200, a request directing the storage device 100 to write data. For example, the storage device 100 may receive, from the host 200, a write command of the storage device 100, write data to be written in the non-volatile memory device 120, and an address of a logical space corresponding to the write data.

In operation S1102, the storage device 100 may search for an instance, which corresponds to the address (i.e., a logical address) received in operation S1101, is associated with a command for allocating a physical address in advance, and is activated on the flash translation layer FTL.

In operation S1103, the storage device 100 may determine whether the corresponding instance is found. When a result of perform operation S1102 indicates that an appropriate instance is not found, the storage device 100 may perform operation S1111. When the result of perform operation S1102 indicates that the appropriate instance is found, the storage device 100 may perform operation S1104.

In operation S1104, the storage device 100 may determine whether a single instance is found as the result of performing operation S1102. When it is determined that two or more instances are found as the result of performing operation S1102, the storage device 100 may perform operation S1105. When it is determined that only one instance is found as the result of performing operation S1102, the storage device 100 may perform operation S1106.

In operation S1105, the storage device 100 may return an error message to the host 200. For example, the storage device 100 may return, to the host 200, a message providing notification that the command for allocating a physical space in advance is incorrect.

In operation S1106, the storage device 100 may determine whether a physical address is allocated. For example, based on metadata included in the found instance and the F2P table 420, the storage device 100 may determine whether there is a physical address (e.g., a number of a memory block) allocated to the instance found as the result of performing operation S1102. When it is determined that there is a physical address allocated in advance, the storage device 100 may perform operation S1107. When it is determined that there is no physical address allocated in advance, the storage device 100 may perform operation S1110.

In operation S1107, the storage device 100 may write the write data in a storage space of the non-volatile memory device 120 corresponding to the allocated physical address, based on the instance found in operation S1102. In operation S1108, the storage device 100 may update a pointer indicating a next data write location included in the metadata of the instance found in operation S1102. In operation S1109, the storage device 100 may update the L2P table 430 based on a result of performing operation S1107.

In operation S1110, the storage device 100 may allocate a physical address to the logical address received in operation S1101, based on the instance found in operation S1102. After the storage device 100 performs operation S1110, the storage device 100 may perform operation S1107.

In operation S1111, the storage device 100 may allocate a physical address to the logical address received in operation S1101, based on an instance (e.g., the instance NFAI) not associated with the command for allocating a physical space in advance. In operation S1112, the storage device 100 may write the write data in a storage space corresponding to the physical address of the non-volatile memory device 120, which is allocated in operation S1111. In operation S1113, the storage device 100 may update a pointer indicating a next data write location included in metadata of the instance used in operation S1111. Afterwards, the storage device 100 may perform operation S1109.

Figure 12:
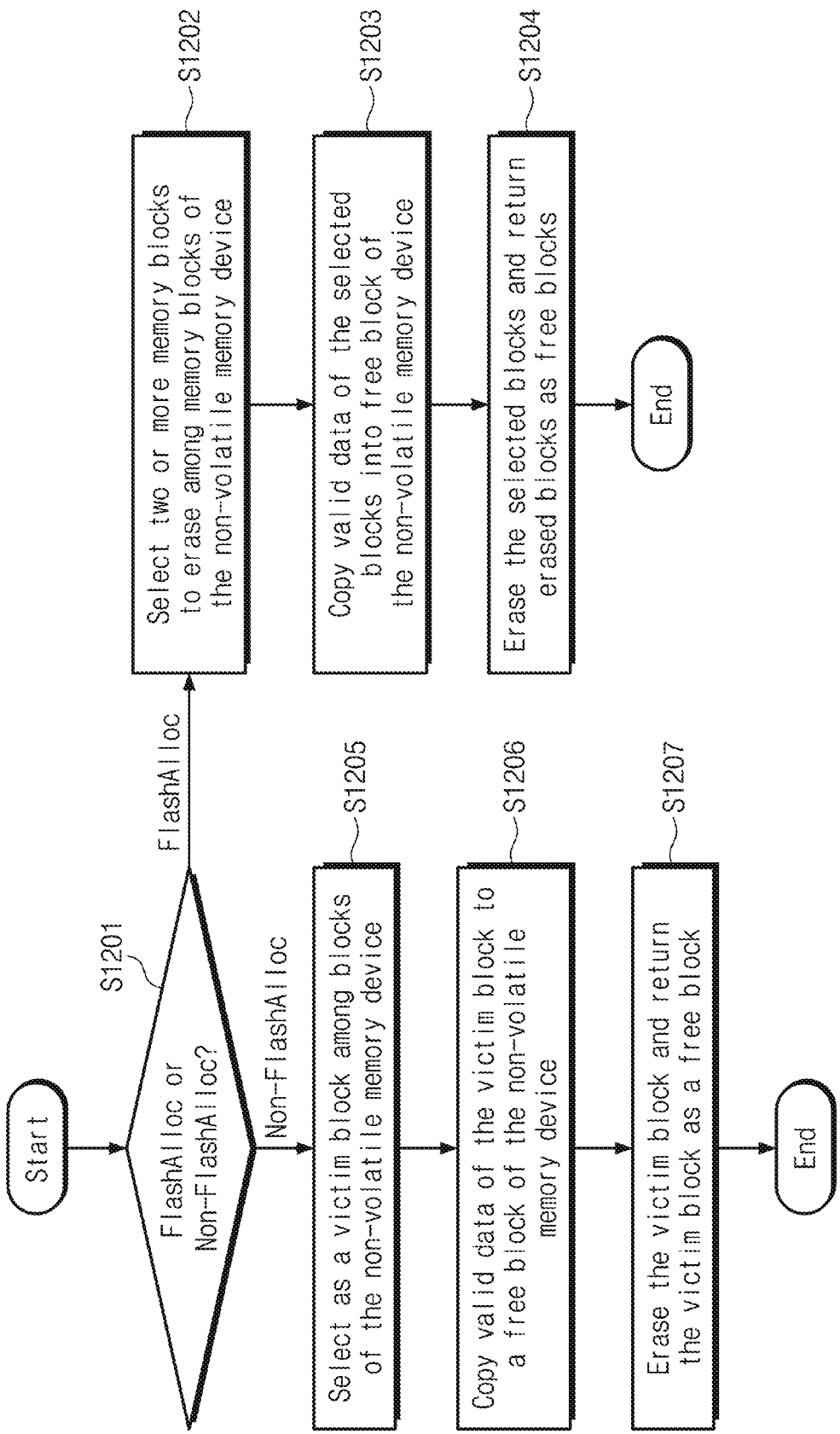
FIG. 12 is a flowchart illustrating how to perform a garbage collection operation according to an embodiment of the presented disclosure.

FIG. 12 is a flowchart illustrating how to perform a garbage collection operation according to an embodiment of the presented disclosure. Referring to FIGS. 1, 2, 4, and 12, the storage device 100 may perform operation S1201 to operation S1207.

In operation S1201, the storage device 100 may determine whether the garbage collection operation to be performed is associated with the command for allocating a physical space in advance. For example, the storage device 100 may perform the garbage collection operation for the purpose of allocating a memory block to an instance (e.g., one of the instances FAI1 to FAIm of FIG. 4) found in response to the command for allocating a physical space in advance. In this case, the storage device 100 may perform operation S1202 to operation S1204.

For another example, the storage device 100 may receive a write request from the host 200 in a state where the command for allocating a physical space in advance is not called. For example, there may be no physical space group ID that is in advance allocated to a logical address(es) associated with the write request received from the host 200. In response to receiving the write request, the storage device 100 may perform the garbage collection operation for the purpose of allocating a memory block. In this case, the storage device 100 may perform operation S1205 to operation S1207.

In operation S1202, the storage device 100 may select two or more of the memory blocks BLK1 to BLKn of the non-volatile memory device 120 for the purpose of performing an erase operation. For example, the storage device 100 may select memory blocks each including a relatively great number of invalidated pages. In operation S1203, the storage device 100 may copy valid data of the blocks selected in operation S1202 to one of free blocks of the non-volatile memory device 120. In operation S1204, the storage device 100 may perform an erase operation on the memory blocks selected in operation S1202 and may return the erased memory blocks as free blocks.

When the write request is received in a state where the command for allocating a physical space in advance is not called, in operation S1205, the non-volatile memory device 120 may select one of the memory blocks BLK1 to BLKn of the non-volatile memory device 120 as a victim block. For example, the storage device 100 may select a memory block, which includes a smallest number of valid pages, from among the memory blocks BLK1 to BLKn as a victim block. In operation S1206, the storage device 100 may copy valid data of the victim block to one of free blocks of the non-volatile memory device 120. In operation S1207, the storage device 100 may perform the erase operation on the victim block and may return the erased victim block as a free block.

Figure 13:
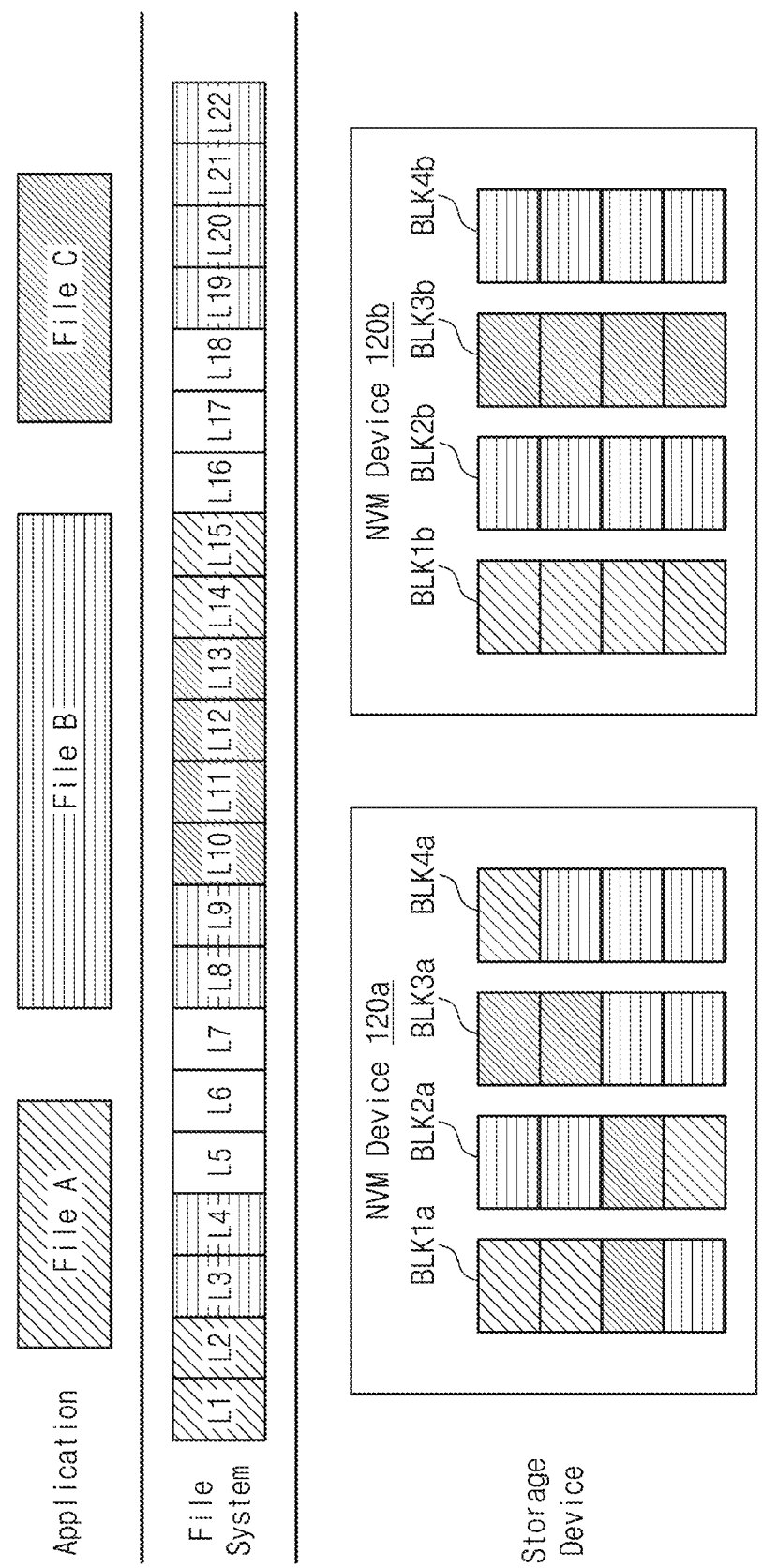
FIG. 13 is a block diagram illustrating data stored in a non-volatile memory device of FIG. 1 according to an embodiment of the presented disclosure.

FIG. 13 is a block diagram illustrating data stored in a non-volatile memory device of FIG. 1 according to an embodiment of the presented disclosure. Referring to FIGS. 1, 2, and 13, a specific application program (e.g., the application program 311a of FIG. 3) executed on a host may request storage spaces for file A, file B, and file B from an operating system. An OS (e.g., the OS 320a of FIG. 3A or the database management system 320b of FIG. 3B) may call a system call for allocating a logical space to a file system (e.g., the file system 321a of FIG. 3) in response to a request of the application program.

In response to the called system call, the OS may allocate logical spaces to file A, file B, and file C. The OS may allocate continuous logical pages to the same file, but the presented disclosure is not limited thereto. In the embodiment illustrated in FIG. 13, the OS may allocate partially continuous logical pages L1, L2, L14, and L15 to file A, may allocate partially continuous logical pages L3, L4, L8, L9, and L19 to L22 to file B, and may allocate partially continuous logical pages L10 to L13 to file C.

The host that includes a software layer including the file system may be connected with a storage device. In this case, the host may be connected with one of an interface supporting the command for allocating a physical space in advance and an interface not supporting the command.

A non-volatile memory device 120a may be included in a storage device that is connected with the interface not supporting the command for allocating a physical space in advance. Accordingly, the storage device including the non-volatile memory device 120a may receive a request of the application program, which is associated with a write operation, and may then allocate a physical space to data associated with the request of the application program. In other words, the storage device that is connected with the interface not supporting the command for allocating a physical space in advance may allocate a physical space in response to receiving the request for the write operation from the host, that is, in an on-demand manner.

In an embodiment, the application program may not want to write the whole file A in the storage device at the same time. For example, the application program may request the OS to write only data belonging to the logical pages L1 and L2 of the logical pages L1, L2, L14, and L15 associated with file A in the storage device. As such, a time when a physical space is allocated to the data belonging to the logical pages L1 and L2 may be different from a time when a physical space is allocated to the data belonging to the logical pages L14 and L15. As a result, the data of file A may be scattered into and stored in a plurality of memory blocks (e.g., memory blocks BLK1a, BLK2a, and BLK4a) of the non-volatile memory device 120a. As in the above description, file B and file C may also be scattered into and stored in a plurality of memory blocks of the non-volatile memory device 120a.

In another embodiment, file A and file B may be associated with different application programs, respectively. For example, file A may be associated with the application program 311a of FIG. 3A, and file B may be associated with the application program 312a of FIG. 3A. In this case, a write request for file A of the application program 311a and a write request for file B of the application program 312a may be made at the same time. As such, logical pages associated with different files may be stored in the same memory block (e.g., a memory block BLK3a) of the non-volatile memory device 120a.

In the embodiment illustrated in FIG. 13, data belonging to different files may be stored in one memory block of the non-volatile memory device 120a. For example, a part of data belonging to file A, a part of data belonging to file B, and a part of data belonging to file C may be together stored in the memory block BLK1a. Life cycles of data belonging to different files may be different. That is, the data belonging to the different files may be invalidated at different times.

Compared to the non-volatile memory device 120a, a non-volatile memory device 120b may be included in a storage device connected with the interface supporting the command (e.g., a "FlashAlloc" command) for allocating a physical space in advance. Accordingly, the storage device including the non-volatile memory device 120b may in advance allocate a physical space to data associated with a request for a write operation of an application program, before receiving the request from the host.

In response to that a system call for allocating a logical space in advance is called by an operating system (OS), the OS may transfer the command for allocating a physical space in advance to the storage device including the non-volatile memory device 120b. In response to the called command for allocating a logical space in advance, the storage device including the non-volatile memory device 120b may allocate the same physical space group ID to data belonging to the same logical object (i.e., the same file). The storage device may allocate unique memory blocks to physical space group IDs, respectively. As a result, data belonging to different logical objects may be stored in different memory blocks.

In the embodiment illustrated in FIG. 13, data belonging to file A may be stored in a memory block BLK1b of the non-volatile memory device 120b. Data belonging to file B may be stored in memory blocks BLK2b and BLK4b of the non-volatile memory device 120b. Data belonging to file C may be stored in a memory block BLK3b of the non-volatile memory device 120b. Because the memory block BLK1b only stores data belonging to file A, the probability that all the data stored in the memory block BLK1b are invalidated at the same time is high.

New data may fail to be overwritten on data that are previously stored in the memory blocks BLK1a to BLK4a and BLK2b to BLK4b of the non-volatile memory devices 120a and 120b. Also, the memory blocks BLK1a to BLK4a and BLK2b to BLK4b may be erased in units of memory block. Therefore, in the case where one memory block includes a plurality of invalidated pages, a write amplification characteristic of a storage device may degrade. Accordingly, compared to a write amplification characteristic of the storage device including the non-volatile memory device 120a, a write amplification characteristic of the storage device including the non-volatile memory device 120b may be improved. As the write amplification characteristic of the storage device including the non-volatile memory device 120b is improved, a speed at which application programs executable on a host process data may also be improved.

According to an embodiment of the presented disclosure, a storage device may receive an address range of a logical space and a request directing allocation of a physical space to the logical space, before a write request is received from a host. In response to the request directing allocation of a physical space to the logical space, the storage device may allocate a physical space group ID to the address range of the logical space thus received. As such, a storage device with improved write performance may be provided.

While the presented disclosure has been described with reference to embodiments thereof, it will be apparent to those of ordinary skill in the art that various changes and modifications may be made thereto without departing from the spirit and scope of the presented disclosure as set forth in the following claims.

What is claimed is:

1. A storage device comprising:
a non-volatile memory device including a plurality of memory blocks;
a buffer memory; and
a storage controller configured to
receive a first allocation request and first logical address information from a host,
allocate logical addresses of the first logical address information to a first physical group of the plurality of memory blocks in response to the first allocation request by determining whether a physical group associated with the first logical address information exists based on a first mapping table and updating the first mapping table in response to an allocation of the first physical group,
receive a first write request and first write data associated with the first logical address information, and
store the first write data in the buffer memory and write the first write data stored in the buffer memory in memory blocks associated with the first physical group, from among the plurality of memory blocks, in response to the first write request,
wherein the first allocation request precedes the first write request.

2. The storage device of claim 1, further comprising:
a first mapping table for mapping the logical addresses of the first logical address information and the first physical group.

3. The storage device of claim 2, further comprising:
a second mapping table for mapping the first physical group and the memory blocks belonging to the first physical group from among the plurality of memory blocks; and a third mapping table for mapping a first logical address of the first logical address information and a first physical address.

4. The storage device of claim 3, wherein the storage controller receives a second write request, second logical address information, and second write data, allocates a second physical address to a second logical address of the second logical address information based on the first to third mapping tables, and writes the second write data by using the second physical address, and
wherein the second physical address is irrelevant to the first physical group.

5. The storage device of claim 2, wherein the storage controller receives a second allocation request and second logical address information from the host and determines whether there is a group of memory blocks associated with the second logical address information from among the plurality of memory blocks, based on the first mapping table.

6. The storage device of claim 5, wherein, when the group of the memory blocks associated with the second logical address information is absent, the storage controller allocates a second physical group to logical addresses of the second logical address information, and
wherein the second physical group is irrelevant to the first physical group.

7. The storage device of claim 5, wherein, when the group of the memory blocks associated with the second logical address information exists, the storage controller allocates second physical addresses associated with the first physical group to logical addresses of the second logical address information.

8. The storage device of claim 1, wherein the non-volatile memory device includes a solid state drive (SSD).

9. An operating method of a storage device which includes a non-volatile memory including a plurality of memory blocks and a storage controller, the method comprising:
receiving a first allocation request and first logical address information about a first logical space from a host;
allocating a first physical group identifier (ID) to logical addresses of the first logical address information;
receiving a first write request for first write data associated with the first logical address information from the host;
storing the first write data in a buffer memory of the storage device; and
writing the first write data stored in the buffer memory in a first memory block associated with the first physical group ID from among the plurality of memory blocks, in response to the first write request,
wherein the first allocation request precedes the first write request, and
wherein the allocating of the first physical group ID to the logical addresses of the first logical address information includes,
determining whether a physical group ID associated with the first logical address information exists based on a first mapping table, and
updating the first mapping table in response to an allocation of the first physical group ID.

10. The method of claim 9, wherein the writing of the first write data in the first memory block includes:
looking up a first instance corresponding to the first logical address information, based on a first mapping table for mapping the first physical group ID to the logical addresses of the first logical address information and a second mapping table for mapping the first physical group ID to the first memory block;
writing the first write data at a location of the first memory block, which a first physical address corresponding to the first instance indicates; and
updating the first instance in response to the writing of the first write data,
wherein the first instance includes metadata associated with the first logical address information, the first memory block, and a first point.

11. The method of claim 10, wherein
the first physical address is associated with the first memory block and first pointer, and
the updating of the first instance includes updating the first pointer.

12. The method of claim 9, further comprising:
receiving a second write request for second write data associated with second logical address information from the host;
looking up an instance corresponding to the second logical address information in response to the second write request;
when a first instance being a single instance corresponding to the second logical address information is found, writing the second write data in the non-volatile memory device based on the first instance thus found;
when a plurality of instances corresponding to the second logical address information are found, returning an error message to the host; and
when no instance corresponding to the second logical address information is found,
allocating a second memory block to logical addresses of the second logical address information;
generating a second instance which is based on the logical addresses of the second logical address information and the second memory block; and
writing the second write data based on the second instance.

13. The method of claim 9, wherein the storage controller allocates the first memory block of the plurality of memory blocks to the first physical group ID at a time when the first allocation request is received.

14. The method of claim 9, wherein the storage controller allocates the first memory block of the plurality of memory blocks to the first physical group ID at one of a first time when the first write request is received and a second time when a first reference time passes from a time when the first allocation request is received.

15. An operating method of a storage system which includes a host and a storage device, the method comprising:
calling, at the host, a first command for allocating a first logical space to first data;
calling, at the host, a second command for allocating a physical space to the first logical space to the storage device in response to the first command;
allocating, at the storage device, a first physical group ID to logical addresses of first logical address information about the first logical space in response to the second command;
requesting, at the host, the storage device to store first write data associated with the first logical address information; and
storing, at the storage device, the first write data in a buffer memory of the storage device and writing the first write data stored in the buffer memory in a first memory block of a plurality of memory blocks of a non-volatile memory device which the storage device includes.

16. The method of claim 15, wherein the allocating of the first physical group ID to the logical addresses of the first logical address information about the first logical space includes:
   updating a first mapping table for mapping the first physical group ID to the logical addresses of the first logical address information about the first logical space;
   allocating the first memory block and a second memory block of the plurality of memory blocks to the first physical group ID; and
   generating a first instance associated with the first logical address information, the first memory block, and the second memory block,
   wherein the writing of the first write data is performed based on the first instance.

17. The method of claim 16, wherein the allocating of the first memory block and the second memory block to the first physical group ID includes:
   performing a garbage collection operation on the plurality of memory blocks.

18. The method of claim 15, wherein the writing of the first write data in the first memory block includes:
   looking up an instance corresponding to the first logical address information;
   in response to that one first instance corresponding to the first logical address information is found, writing the first write data in the first memory block based on the first instance;
   in response to that a plurality of instances corresponding to the first logical address information are found, returning an error message to the host; and
   when no instance corresponding to the first logical address information is found,
   generating a second instance associated with the first logical address information and the first memory block; and
   writing the first write data in the first memory block based on the second instance.

19. The method of claim 15, further comprising:
   calling, at the host, a third command for allocating a second logical space to second data;
   calling, at the host, a fourth command for allocating a physical space to the second logical space to the storage device in response to the third command; and
   allocating, at the storage device, a second physical group ID to logical addresses of second logical address information about the second logical space in response to the fourth command,
   wherein the first logical space and the second logical space do not overlap, and memory blocks associated with the first physical group ID from among the plurality of memory blocks are different from memory blocks associated with the second physical group ID.

* * * * *